(12) United States Patent
Jin et al.

(10) Patent No.: US 12,219,620 B2
(45) Date of Patent: Feb. 4, 2025

(54) DATA TRANSMISSION METHOD AND APPARATUS

(71) Applicant: Huawei Technologies Co., Ltd., Shenzhen (CN)

(72) Inventors: Hui Jin, Beijing (CN); Hongcheng Zhuang, Shenzhen (CN); Yongbo Zeng, Shenzhen (CN); Xiaoyan Duan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 331 days.

(21) Appl. No.: 17/707,458

(22) Filed: Mar. 29, 2022

(65) Prior Publication Data

US 2022/0225439 A1    Jul. 14, 2022

Related U.S. Application Data

(63) Continuation of application No. PCT/CN2020/116124, filed on Sep. 18, 2020.

(30) Foreign Application Priority Data

Sep. 30, 2019 (CN) .......................... 201910943513.9

(51) Int. Cl.
*H04W 76/10* (2018.01)
*H04W 80/10* (2009.01)

(52) U.S. Cl.
CPC ............ *H04W 76/10* (2018.02); *H04W 80/10* (2013.01)

(58) Field of Classification Search
CPC ..... H04W 76/10; H04W 80/10; H04W 76/11; H04W 76/14; H04W 88/04; H04W 92/18; H04W 76/20
See application file for complete search history.

(56) References Cited

U.S. PATENT DOCUMENTS

2007/0218924 A1    9/2007  Burman et al.
2013/0188500 A1    7/2013  He et al.
(Continued)

FOREIGN PATENT DOCUMENTS

CN        103782589 A    5/2014
CN        104067593 A    9/2014
(Continued)

OTHER PUBLICATIONS

3GPP TS 26.234 V15.1.0, Sep. 2018, "3rd Generation Partnership Project; Technical Specification Group Services and System Aspects; Transparent end-to-end Packet-switched; Streaming Service (PSS); Protocols and codecs (Release 15)," 23 pages.
(Continued)

*Primary Examiner* — Dady Chery
(74) *Attorney, Agent, or Firm* — Conley Rose, P.C.

(57) ABSTRACT

A data transmission method, applied to a first terminal device, includes receiving a first message from a second terminal device, determining a first session parameter based on the first message, determining a first session based on the first session parameter, receiving first data from the second terminal device, and sending the first data to a network device using the first session. The first terminal device may determine, based on the first message from the second terminal device, the first session parameter that meets a service requirement of the second terminal device, determine, based on the first session parameter, the first session that meets the service requirement of the second terminal device, and forward data of the second terminal device to the network device using the first session.

20 Claims, 5 Drawing Sheets

(56) References Cited

U.S. PATENT DOCUMENTS

| | | | |
|---|---|---|---|
| 2013/0275615 A1* | 10/2013 | Oyman | H04L 65/75 709/231 |
| 2019/0098495 A1 | 3/2019 | Tenny et al. | |
| 2019/0109823 A1 | 4/2019 | Qiao et al. | |
| 2020/0154515 A1 | 5/2020 | Ni et al. | |
| 2020/0187043 A1 | 6/2020 | Kin et al. | |
| 2021/0031908 A1* | 2/2021 | Sinusas | B64C 27/08 |
| 2022/0158926 A1* | 5/2022 | Wennerstr?m | H04L 41/0853 |
| 2022/0279421 A1* | 9/2022 | Sivakumar | H04W 40/248 |

FOREIGN PATENT DOCUMENTS

| | | |
|---|---|---|
| CN | 108307516 A | 7/2018 |
| CN | 109392042 A | 2/2019 |
| CN | 109429361 A | 3/2019 |
| WO | 2018067956 A1 | 4/2018 |

OTHER PUBLICATIONS

"3rd Generation Partnership Project; Technical Specification Group Services and System Aspects; Procedures for the 5G System; Stage 2(Release 16)," 3GPP Standard; Technical Specification; 3GPPTS 23.502, 3rd Generation Partnership Project (3GPP),Mobile Competence Centre ; 650, Route des Lucioles ;F-06921 Sophia-Antipolis Cedex ; France, vol. SA WG2, No. V16.1.1, Jun. 11, 2019, pp. 1-495, XP051753974.

* cited by examiner

DATA TRANSMISSION METHOD AND APPARATUS

CROSS-REFERENCE TO RELATED APPLICATIONS

This is a continuation of International Patent Application No. PCT/CN2020/116124 filed on Sep. 18, 2020, which claims priority to Chinese Patent Application No. 201910943513.9 filed on Sep. 30, 2019. The disclosures of the aforementioned applications are hereby incorporated by reference in their entireties.

TECHNICAL FIELD

This application relates to the field of communications technologies, and in particular, to a data transmission method and apparatus.

BACKGROUND

When wearing a lightweight virtual reality (VR) head mounted device, a user may watch, using a mobile phone, VR content transmitted by a network device. VR data is not directly transmitted between the VR head mounted device and the network device, but the VR data is sent to the network device using the mobile phone, and the VR data sent by the network device is received using the mobile phone.

When the mobile phone serves as a relay or proxy device to transmit the VR data between the VR head mounted and the network device, an interface (Uu interface) between the mobile phone and the network device transmits compressed VR data of a relatively low rate, and an interface (PC5 interface) between the mobile phone and the VR head mounted device transmits decompressed or lightly compressed VR data of a high rate. When the VR data is transmitted through the foregoing two interfaces, an ultra-low latency is required, for example, a latency of 1 milliseconds (ms) to 10 ms. How the mobile phone ensures a transmission requirement of a VR service on the PC5 interface, for example, determines an attribute of a protocol data unit (PDU) session, a quality of service (QoS) level of a QoS flow, and/or an attribute of a network slice used by the mobile phone to send, to the network device, VR data sent by the VR head mounted device, is not resolved currently.

Customer-premises equipment (CPE) may convert a wireless signal of a fourth generation (4G) mobile communication technology or a fifth generation (5G) mobile communications system into a Wi-Fi signal, and serve a plurality of user equipments (UEs) in a home.

For different services of the UE, data transmission generally needs to be performed using different sessions. For example, for a game service, data transmission needs to be performed using a low-latency session, and for a video service, data transmission needs to be performed using a high-bandwidth session. However, the CPE does not perform a service, generally transmits data of all services using a session shared by all UEs, and cannot provide differentiated services for different services. Consequently, applicability is poor.

Based on this, how a relay or proxy device provides differentiated services for different services of a terminal device becomes a technical problem to be urgently resolved by persons skilled in the art.

SUMMARY

Embodiments of this application provide a data transmission method and apparatus, to resolve a problem of how a relay or proxy device provides differentiated services for different services of a terminal device.

According to a first aspect, an embodiment of this application provides a data transmission method. The method includes receiving a first message from a second terminal device, determining a first session parameter based on the first message, determining a first session based on the first session parameter, receiving first data from the second terminal device, and sending the first data to a network device using the first session.

In this implementation, after receiving the first message from the second terminal device, a first terminal device may determine, based on the first message, the first session parameter that meets a service requirement of the second terminal device, then determine, based on the first session parameter, the first session that meets the service requirement of the second terminal device, and finally forward the data of the second terminal device to the network device using the first session that meets the service requirement of the second terminal device. This improves data transmission efficiency.

With reference to the first aspect, in a first possible implementation of the first aspect, determining the first session based on the first session parameter includes sending a session establishment request message to the network device, where the session establishment request message includes the first session parameter, receiving a session establishment response message sent by the network device, and establishing the first session based on the session establishment response message.

In this implementation, after determining the first session parameter, the first terminal device directly requests, based on the first session parameter, the network device to establish the first session between the first terminal device and the network device. Therefore, a process is relatively simple, and the first session can be determined more quickly.

With reference to the first aspect, in a second possible implementation of the first aspect, determining the first session based on the first session parameter includes: if there is a second session that matches the first session parameter, determining the first session as the second session, where the second session is a session that has been established between the first terminal device and the network device, or if there is no second session that matches the first session parameter, sending a session establishment request message to the network device, where the session establishment request message includes the first session parameter, receiving a session establishment response message sent by the network device, and establishing the first session based on the session establishment response message.

In this implementation, when determining that there is the second session that matches the first session parameter, the first terminal device determines the second session as the first session, and only when determining that there is no second session that matches the first session parameter, the first terminal device requests, based on the first session parameter, the network device to establish the first session between the first terminal device and the network device. This can avoid a waste of network resources, and improve network resource utilization.

With reference to the first aspect, in a third possible implementation of the first aspect, before determining the first session based on the first session parameter, the method further includes determining a first bearer parameter based on the first message, and determining the first session based on the first session parameter includes sending a session establishment request message to the network device, where the session establishment request message includes the first session parameter and the first bearer parameter, receiving a session establishment response message sent by the network device, and establishing the first session based on the session establishment response message, and establishing a first bearer in the first session.

In this implementation, not only the first session may be determined, but also the first bearer may be determined in the first session, so that a service requirement of a terminal device can be better met. In addition, in this implementation, the first terminal device directly requests, based on the determined first session parameter and the determined first bearer parameter, the network device to establish the first session and the first bearer between the first terminal device and the network device. Therefore, a process is relatively simple, and the first session and the first bearer can be determined more quickly.

With reference to the first aspect, in a fourth possible implementation of the first aspect, before determining the first session based on the first session parameter, the method further includes determining a first bearer parameter based on the first message, and the determining a first session based on the first session parameter includes: if there is no second session that matches the first session parameter, sending a session establishment request message to the network device, where the session establishment request message includes the first session parameter and the first bearer parameter, receiving a session establishment response message sent by the network device, and establishing the first session based on the session establishment response message, and establishing a first bearer in the first session.

In this implementation, only when determining that there is no second session that matches the first session parameter, the first terminal device requests, based on the determined first session parameter and the determined first bearer parameter, the network device to establish the first session and the first bearer between the first terminal device and the network device. This can avoid a waste of network resources, and improve network resource utilization.

With reference to the first aspect, in a fifth possible implementation of the first aspect, the first bearer parameter includes a QoS rule parameter, and the method further includes adding a QoS rule corresponding to the QoS rule parameter to the first bearer based on the session establishment response message.

In this implementation, a QoS rule corresponding to the second terminal device is further added to the first bearer. This ensures that data sent by the second terminal can be transmitted using a bearer that meets a service requirement of the second terminal, and implements better applicability.

With reference to the first aspect, in a sixth possible implementation of the first aspect, before determining the first session based on the first session parameter, the method further includes determining a first bearer parameter based on the first message, and determining the first session based on the first session parameter includes: if there is a second session that matches the first session parameter, determining the first session as the second session, where the second session is a session that has been established between the first terminal device and the network device, if the second session includes a second bearer that matches the first bearer parameter, determining a first bearer as the second bearer, or if the second session does not include a second bearer that matches the first bearer parameter, obtaining a session identifier of the second session, and sending a first session modification request message to the network device, where the first session modification request message includes the session identifier of the second session and the first bearer parameter, receiving a first session modification response message sent by the network device, and establishing a first bearer in the first session based on the first session modification response message.

In this implementation, when determining that the second session includes the second bearer that matches the first bearer parameter, the first terminal device determines the first bearer as the second bearer, and only when determining that the second session does not include the second bearer that matches the first bearer parameter, the first terminal device requests, based on the determined first bearer parameter, the network device to establish the first bearer between the first terminal device and the network device in the second session. This can avoid a waste of network resources, and improve network resource utilization.

With reference to the first aspect, in a seventh possible implementation of the first aspect, the first bearer parameter includes a QoS rule parameter, and the method further includes adding a QoS rule corresponding to the QoS rule parameter to the first bearer based on the first session modification response message.

In this implementation, a QoS rule corresponding to the second terminal device is further added to the first bearer. This ensures that data sent by the second terminal can be transmitted using a bearer that meets a service requirement of the second terminal, and implements better applicability.

With reference to the first aspect, in an eighth possible implementation of the first aspect, the first bearer parameter includes a QoS rule parameter, and the method further includes if the second bearer does not include a QoS rule corresponding to the QoS rule parameter, obtaining a session identifier of the second session and a bearer identifier of the second bearer, sending a second session modification request message to the network device, where the second session modification request message includes the session identifier of the second session, the bearer identifier of the second bearer, and the QoS rule parameter, receiving a second session modification response message sent by the network device, and adding the QoS rule corresponding to the QoS rule parameter to the second bearer based on the second session modification response message.

In this implementation, only when determining that the second bearer does not include the QoS rule corresponding to the QoS rule parameter, the first terminal device requests the network device to add the QoS rule corresponding to the QoS rule parameter to the second bearer. This can avoid a waste of network resources, and improve network resource utilization.

With reference to the first aspect, in a ninth possible implementation of the first aspect, the sending the first data to a network device using the first session includes sending the first data to the network device using the first bearer.

In this implementation, data sent by the second terminal device is forwarded to the network device using the first bearer that meets a service requirement of the second terminal, so that data transmission efficiency is higher.

With reference to the first aspect, in a tenth possible implementation of the first aspect, before sending the first data to the network device using the first session, the method further includes receiving a second message from the second terminal device, where the second message includes a session identifier of the first session, determining a first bearer parameter based on the second message, sending a first session modification request message to the network device, where the first session modification request message includes the session identifier of the first session and the first bearer parameter, receiving a first session modification response message sent by the network device, and establishing a first bearer in the first session based on the first session modification response message, and the sending the first data to a network device using the first session includes sending the first data to the network device using the first bearer.

In this implementation, not only the first session may be determined, but also the first bearer may be determined in the first session, so that a service requirement of a terminal device can be better met. In addition, in this implementation, the first terminal device directly requests, based on the determined first bearer parameter, the network device to establish the first bearer between the first terminal device and the network device in the first session. Therefore, a process is relatively simple, and the first bearer can be determined more quickly. Moreover, the first data may be sent to the network device using the first bearer that meets a service requirement of the second terminal device. Therefore, data transmission efficiency is higher.

With reference to the first aspect, in an eleventh possible implementation of the first aspect, before sending the first data to the network device using the first session, the method further includes receiving a second message from the second terminal device, where the second message includes a session identifier of the first session, determining a first bearer parameter based on the second message, if the first session does not include a second bearer that matches the first bearer parameter, sending a first session modification request message to the network device, where the first session modification request message includes the session identifier of the first session and the first bearer parameter, and the second bearer is a bearer that has been established in the second session, receiving a first session modification response message sent by the network device, and establishing a first bearer in the first session based on the first session modification response message, and the sending the first data to a network device using the first session includes sending the first data to the network device using the first bearer.

In this implementation, only when determining that the first session does not include the second bearer that matches the first bearer parameter, the first terminal device requests the network device to establish the first bearer between the first terminal device and the network device in the first session. This avoids a waste of network resources, and improves network resource utilization.

According to a second aspect, an embodiment of this application provides a data transmission apparatus. The apparatus includes a processor and a memory. The processor is coupled to the memory, the memory is configured to store computer program instructions, and when the processor executes the computer program instructions, the data transmission apparatus is enabled to perform the data transmission method according to the first aspect and the possible implementations of the first aspect.

According to a third aspect, an embodiment of this application provides a computer storage medium. The computer storage medium stores instructions, and when the instructions are run on a computer, the computer is enabled to perform some or all of the steps of the data transmission method according to the first aspect and the possible implementations of the first aspect.

According to a fourth aspect, an embodiment of this application provides a computer program product. When the computer program product runs on a computer, the computer is enabled to perform some or all of the steps of the data transmission method according to the first aspect and the possible implementations of the first aspect.

The embodiments of this application provide a data transmission method and apparatus, to resolve a problem of how a relay or proxy device provides differentiated services for different services of a terminal device. In the method, after receiving a first message from a second terminal device, a first terminal device may determine, based on the first message, a first session parameter that meets a service requirement of the second terminal device, then determine, based on the first session parameter, a first session that meets the service requirement of the second terminal device, and finally forward data of the second terminal device to a network device using the first session that meets the service requirement of the second terminal device. This improves data transmission efficiency.

DESCRIPTION OF EMBODIMENTS

Figure 1:
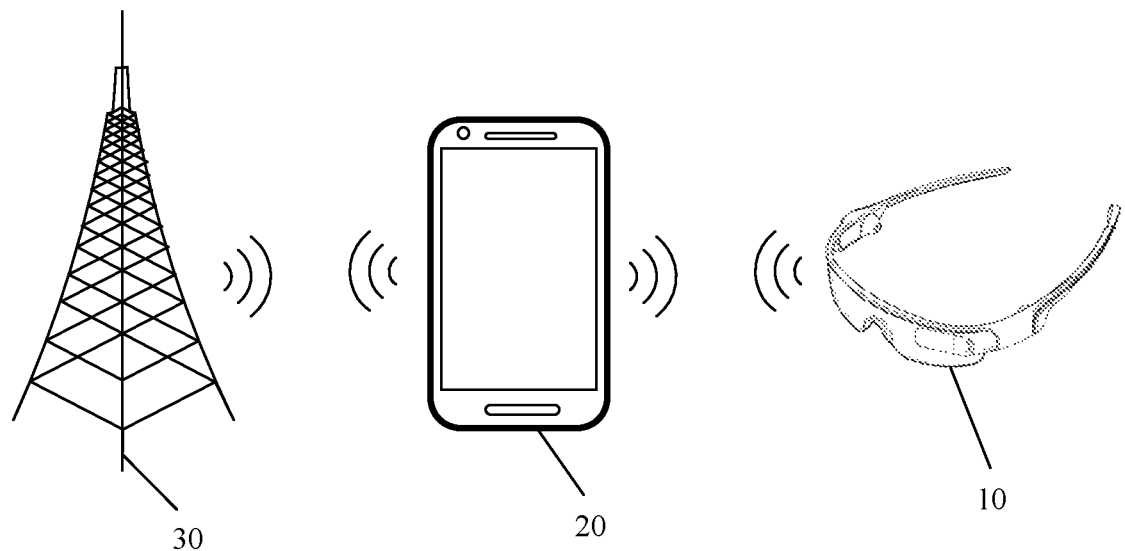
FIG. 1 is a schematic diagram of an application scenario according to this application.

The following describes the technical solutions of this application with reference to the accompanying drawings.

In the descriptions of this application, unless otherwise specified, "/" means "or". For example, A/B may represent A or B. In this specification, "and/or" describes only an association relationship between associated objects and represents that there may be three relationships. For example, A and/or B may represent the following three cases: Only A exists, both A and B exist, and only B exists. In addition, "at least one" means one or more, and "a plurality of" means two or more. Terms such as "first" and "second" do not constitute a limitation on a quantity or an execution sequence, and the terms such as "first" and "second" do not indicate a definite difference.

It should be noted that, in this application, a term such as "example" or "for example" is used to represent giving an example, an illustration, or descriptions. Any embodiment or design solution described as an "example" or "for example" in this application should not be explained as being more preferable or having more advantages than another embodiment or design solution. Exactly, use of the word such as "example" or "for example" is intended to present a related concept in a specific manner.

To facilitate understanding of the technical solutions in this application, the following first briefly describes technical terms in this application.

1. Bearer

In a 4G communications system, the bearer may be an evolved packet system (EPS) bearer. In a 5G communications system, the bearer may be a QoS flow The bearer may be used to transmit data between a terminal device and a network device.

There may be bearers of a plurality of levels. The terminal device usually runs a plurality of applications of different application types. To obtain higher data transmission efficiency, data of different application types may be transmitted using bearers of different levels. For example, game data may be transmitted using a bearer of a low-latency level, video data may be transmitted using a bearer of a high-bandwidth level, and social data has a relatively low requirement on a bearer level, and may be transmitted using a bearer of any level.

Optionally, a character of each bearer may be represented using a bearer parameter. A QoS flow in the 5G communications system is used as an example for description below. For example, a QoS character of each QoS flow may be represented using a QoS parameter, and the QoS parameter may include one or more of the following: a QoS flow identifier (QFI), a 5G QoS identifier (5QI), a reflective QoS attribute, a guaranteed flow bit rate (GFBR), and a maximum flow bit rate (MFBR).

2. Session

In the 4G communications system, the session may be a packet data network (PDN) connection. In the 5G communications system, the session may be a PDU session.

There may be sessions of a plurality of attributes. An attribute of each session may be represented using a session parameter of the session. The session parameter may include one or more of the following: an internet protocol (IP) address that is referred to as an IP address for short, a session and service continuity (SSC) mode that is referred to as an SSC mode for short, a data network name (DNN), a session type, a session aggregate maximum bit rate (AMBR), and a handover indication parameter. The handover indication parameter is used to indicate whether the terminal device supports switching between the following two communications modes: communicating with the network device and communicating with the terminal device.

When data is transmitted between the terminal device and the network device, to obtain relatively high transmission efficiency, data of different application types may be transmitted using sessions of different attributes.

Each session may include at least one bearer. For example, each PDU session may include at least one QoS flow.

3. Network Slice

In the 5G communications system, to better match a feature of each wireless communications service, different network slices may be established for different types of services using a virtualization technology, and each network slice may be considered as a complete network. Based on this, when data is transmitted between the terminal device and the network device, if different network slices may be established for data of different application types, higher transmission efficiency may be obtained.

Optionally, the terminal device may indicate, to a network using a network slice parameter such as a single network slice selection assistance information (S-NSSAI) identifier, a network slice that requests access. Generally, a session parameter may further include a network slice parameter used to indicate a network slice to which a session belongs. Each network slice may include at least one session.

With reference to the foregoing technical terms, the following uses an example to describe an application scenario of the technical solutions provided in this application. The embodiments of this application may be applied to the 5G communications system, or may be applied to the 4G communications system. For ease of description, the following uses the 5G communications system as an example for description.

For a first application scenario, refer to FIG. 1. FIG. 1 is a schematic diagram of an application scenario according to this application. In the application scenario shown in FIG. 1, a user wears a lightweight VR head mounted device 10, and watches, using a mobile phone 20, VR content transmitted by a network device 30. In this application scenario, VR data is not directly transmitted between the VR head mounted device 10 and the network device 30, but the VR data is sent to the network device 30 using the mobile phone 20, and the VR data sent by the network device 30 is received using the mobile phone 20.

When the mobile phone 20 serves as a relay or proxy device to transmit the VR data between the VR head mounted 10 and the network device 30, an interface (Uu interface) between the mobile phone 20 and the network device 30 transmits compressed VR data of a relatively low rate, and an interface (PC5 interface) between the mobile phone 20 and the VR head mounted device 10 transmits decompressed or lightly compressed VR data of a high rate. When the VR data is transmitted through the foregoing two interfaces, an ultra-low latency is required, for example, a latency of 1 ms to 10 ms. How the mobile phone 20 ensures a transmission requirement of a VR service on the PC5 interface, for example, determines an attribute of a PDU session, a QoS level of a QoS flow, and/or an attribute of a network slice used by the mobile phone 20 to send, to the network device 30, VR data sent by the VR head mounted device 10, is a technical problem to be urgently resolved by persons skilled in the art.

Figure 2:
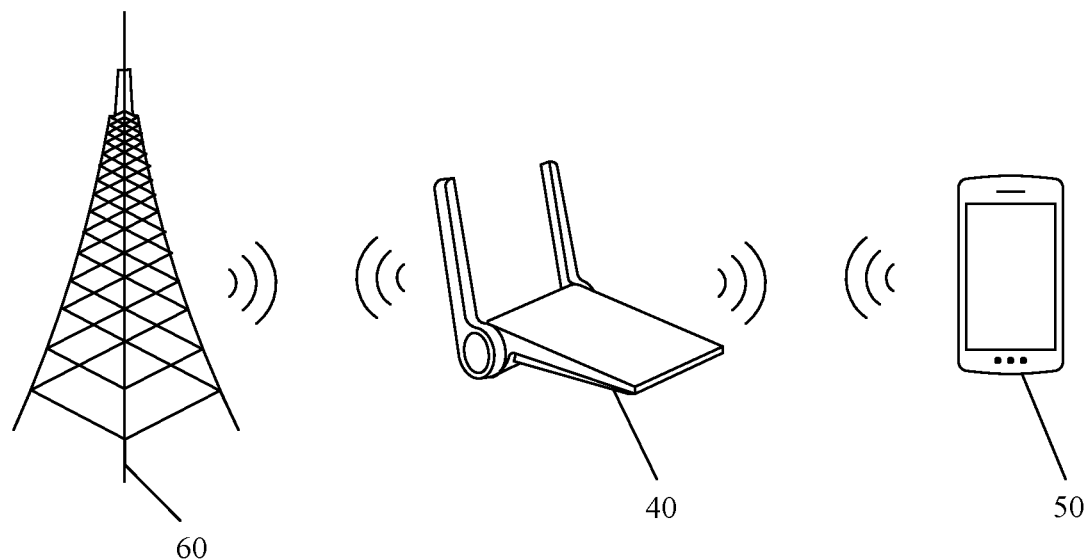
FIG. 2 is a schematic diagram of another application scenario according to this application.

For a second application scenario, refer to FIG. 2. FIG. 2 is a schematic diagram of another application scenario according to this application. In the application scenario shown in FIG. 2, CPE 40 serves as a relay or proxy device, and may send, to a network device 60, data sent by UE 50, or may send, to the UE 50, data sent by the network device 60.

In this application scenario, the CPE 40 does not perform a service, and after receiving the data sent by the UE 50, the CPE 40 cannot learn of an attribute of a PDU session, a QoS level of a QoS flow, and/or an attribute of a network slice that need/needs to be used. That the CPE sends, to the network device 60, the data sent by the UE 50 may meet a data transmission requirement of the UE 50. This implements relatively high transmission efficiency. Therefore, the CPE 40 usually sends, to the network device 60 using a default session and QoS flow that are shared by all terminal devices, the data sent by the UE 50. Based on this, how the CPE 40 meets the data transmission requirement of the UE 50 is a technical problem to be urgently resolved by persons skilled in the art.

To resolve the foregoing technical problem, the embodiments of this application provide the following technical solutions. For further content of the technical solutions, refer to the following descriptions.

The technical solutions provided in the embodiments of this application may be applied to various communications systems, for example, a new radio (NR) communications system using a 5th generation (5G) communication technology, a future evolved system, or a plurality of convergent communications systems.

In addition, a network architecture and an application scenario described in the embodiments of this application are intended to describe the technical solutions in the embodiments of this application more clearly, and do not constitute a limitation on the technical solutions provided in the embodiments of this application. Persons of ordinary skill in the art may know that, with the evolution of the network architecture and the emergence of a new service scenario, the technical solutions provided in the embodiments of this application are also applicable to similar technical problems.

Figure 3:
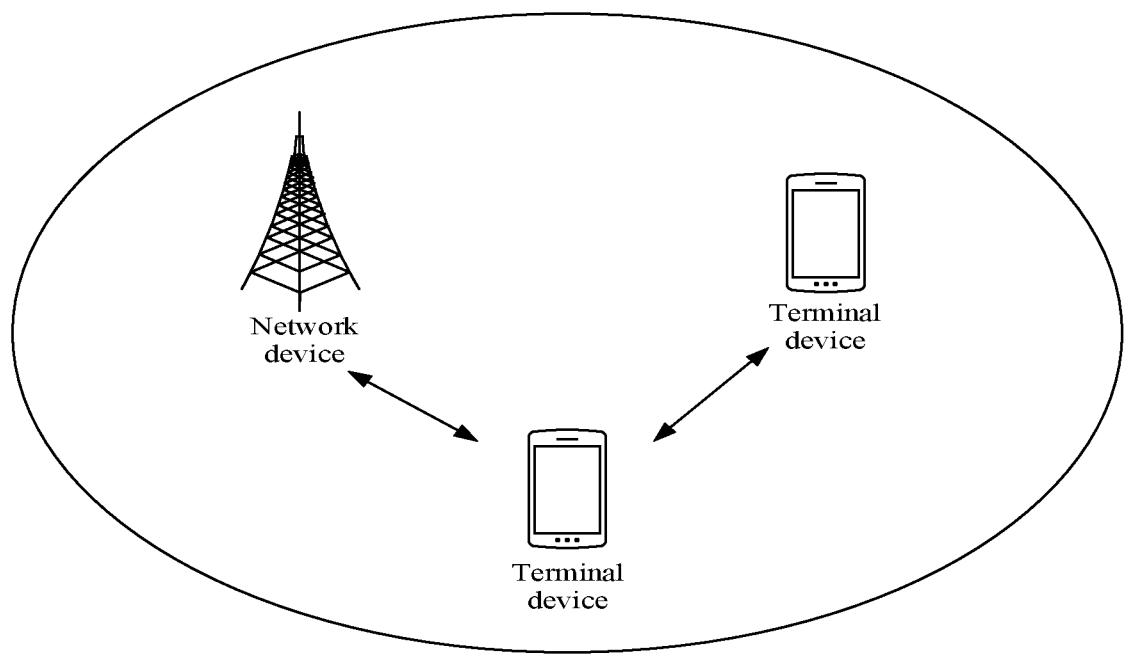
FIG. 3 is a schematic diagram of an architecture of a communications system according to this application.

For example, for a communications system to which the technical solutions provided in this application are applicable, refer to FIG. 3. FIG. 3 is a schematic diagram of an architecture of a communications system according to this application. With reference to FIG. 3, it can be learned that the communications system may include a plurality of network devices and at least two terminal devices.

The network device may include a wireless communications base station or base station controller, an authentication management function (AMF) device, a session management function (SMF) device, a user plane function (UPF), and the like. For example, the base station may include various types of base stations, such as a micro base station (also referred to as a small cell), a macro base station, a relay station, and an access point. This is not limited in the embodiments of this application. In the embodiments of this application, the base station may be a base transceiver station (BTS) in a global system for mobile communications (GSM) or code-division multiple access (CDMA), a NodeB in wideband code-division multiple access (WCDMA), an evolved NodeB (eNB or eNodeB) in Long-Term Evolution (LTE), an eNB in the internet of things (IoT) or the narrowband internet of things (NB-IoT), or a base station in a 5G mobile communications network or a future evolved public land mobile network (PLMN). This is not limited in the embodiments of this application. In the embodiments of this application, an apparatus configured to implement a function of the network device may be the network device, or may be an apparatus that can support the network device in implementing the function, for example, a chip system. In the embodiments of this application, an example in which an apparatus configured to implement a function of the network device is the network device is used to describe the technical solutions provided in the embodiments of this application.

The network device described in this application, for example, the base station, usually includes a baseband unit (BBU), a remote radio unit (RRU), an antenna, and a feeder used to connect the RRU and the antenna. The BBU is configured to be responsible for signal modulation. The RRU is configured to be responsible for radio frequency processing. The antenna is configured to be responsible for conversion between a pilot wave on a cable and a space wave in the air. A distributed base station greatly shortens a length of the feeder between the RRU and the antenna. This can reduce a signal loss and reduce costs of the feeder. In addition, the RRU and the antenna are relatively small and can be installed at any place. This makes network planning more flexible. The RRU may be remotely placed. In addition, all BBUs may be centralized and placed in a central office (CO). In this centralized manner, a quantity of base station equipment rooms can be greatly reduced, energy consumption of auxiliary devices, especially air conditioners, can be reduced, and carbon emissions can be greatly reduced. In addition, after distributed BBUs are integrated into a BBU baseband pool, the BBUs can be managed and scheduled centrally, and resources can be allocated more flexibly. In this mode, all physical base stations evolve into virtual base stations. All the virtual base stations share information such as data sent and received by users and channel quality in the BBU baseband pool, and cooperate with each other, to implement joint scheduling.

In some deployments, the base station may include a centralized unit (CU) and a distributed unit (DU). The base station may further include an active antenna unit (AAU). The CU implements some functions of the base station, and the DU implements some functions of the base station. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer eventually becomes information at the PHY layer, or is converted from the information at the PHY layer. Therefore, in this architecture, higher layer signaling, for example, RRC layer signaling or PDCP layer signaling, may also be considered as being sent by the DU or sent by the DU and the AAU. It may be understood that the network device may be a device including one or more of a CU node, a DU node, and an AAU node. In addition, the CU may be classified as a network device in a RAN, or the CU may be classified as a network device in a core network (CN). This is not limited herein.

The terminal device is a device that has a wireless transceiver function. The terminal device may be deployed on land, including an indoor or outdoor device, a handheld device, or a vehicle-mounted device, or may be deployed on a water surface (for example, on a ship), or may be deployed in air (for example, on an aircraft, a balloon, or a satellite). The terminal device may be user equipment (UE). The UE includes a handheld device, a vehicle, a vehicle-mounted device, a wearable device, or a computing device that has a wireless communication function. For example, the UE may be a mobile phone, a tablet computer, or a computer having a wireless transceiver function. Alternatively, the terminal device may be a VR terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, CPE, or the like. In the embodiments of this application, an apparatus configured to implement a function of the terminal device may be the terminal device, or may be an apparatus that can support the terminal device in implementing the function, for example, a chip system. In the embodiments of this application, the chip system may include a chip, or may include a chip and another discrete component. In the embodiments of this application, an example in which an apparatus configured to implement a function of the terminal device is the terminal device is used to describe the technical solutions provided in the embodiments of this application.

With reference to the accompanying drawings, the following describes the technical solutions provided in the embodiments of this application.

Figure 4:
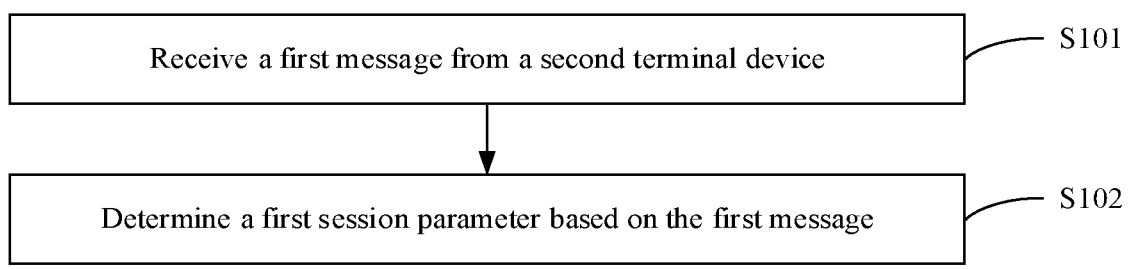
FIG. 4 is a schematic flowchart of an implementation of a session parameter determining method according to this application.

FIG. 4 is a schematic flowchart of an implementation of a session parameter determining method according to this application. The method is applied to a first terminal device, and includes the following steps.

Step S101: Receive a first message from a second terminal device.

In the technical solution provided in this application, the first terminal device may forward, to a network device or a network-side server, data that needs to be sent by the second terminal device. To be specific, the second terminal device first sends, to the first terminal device, the data that needs to be sent, and then the first terminal device sends the data to the network device or the network-side server. In addition, when sending the data to the network device or the network-side server, the first terminal device may send the data according to a service requirement of the second terminal device using a session that meets the service requirement. Similarly, the first terminal device may receive data from the network device or the network-side server, and forward the data to the second terminal device.

It can be learned from the content of the foregoing embodiment that a session parameter may be used to represent a session attribute. Therefore, a session may be determined based on a session parameter. Based on this, before forwarding the data of the second terminal device, the first terminal device first determines a session parameter of the session that meets the service requirement of the second terminal device. In this application, for ease of distinguishing, the session parameter that is determined by the first terminal device and that is of the session that meets the service requirement of the second terminal device is referred to as a first session parameter for short.

In some optional application scenarios of this application, signaling interaction is performed between the first terminal device and the second terminal device by sending and receiving messages. For example, the first terminal device may be a mobile phone, and the second terminal device may be a VR head mounted device.

In this application scenario, the first terminal device may receive the first message from the second terminal device, to further determine the first session parameter based on the received first message. There may be a plurality of implementations in which the first terminal device receives the first message from the second terminal device.

For example, the second terminal device may determine, according to the service requirement of the second terminal device, a session parameter of a session that meets the service requirement of the second terminal device, and then send the first message including the session parameter to the first terminal device. In this application, for ease of distinguishing, the session parameter that is determined by the second terminal device and that is of the session that meets the service requirement of the second terminal device is referred to as a second session parameter for short. In other words, in this application scenario, the first terminal device may receive the first message from the second terminal device. The first message includes the second session parameter. After receiving the first message from the second terminal device, the first terminal device may obtain the second session parameter by parsing the first message, and then may determine the first session parameter based on the second session parameter without a need of analyzing the service requirement of the second terminal device. Therefore, efficiency of determining the first session parameter by the first terminal device is higher.

For example, the second terminal device cannot independently determine the second session parameter. For example, when a service processing capability of the second terminal device is relatively weak, the second terminal device cannot determine the second session parameter. In this application scenario, the second terminal device may send the first message including session parameter determining information to the first terminal device, so that the first terminal device can determine the first session parameter based on the session parameter determining information. In other words, in this application scenario, the first terminal device may alternatively receive the first message from the second terminal device. The first message includes the session parameter determining information. The session parameter determining information may be information including an application identifier, or may be other information that may be used by the first terminal device to determine the first session parameter. This is not limited in this application. In this implementation, a requirement on the service processing capability of the second terminal device is reduced. In other words, even if the service processing capability of the second terminal device is relatively weak and consequently the second terminal device cannot determine the second session parameter, the second terminal device may still notify, using the session parameter determining information, the first terminal device of a requirement of a session required by the second terminal device, so that the first terminal device forwards the data of the second terminal device using the session that meets the service requirement of the second terminal device. Therefore, applicability is better.

Step S102: Determine the first session parameter based on the first message.

In this application, there may be a plurality of implementations of determining the first session parameter based on the first message.

Optionally, if the first message received by the first terminal device includes the second session parameter, the first terminal device may obtain the second session parameter by parsing the first message, and then the first terminal device may determine the second session parameter as the first session parameter. In this implementation, a process in which the first terminal device determines the first session parameter is relatively simple, and service performance of the second terminal device does not need to be analyzed. Therefore, efficiency of determining the first session parameter is higher.

Optionally, if the first message received by the first terminal device includes the second session parameter, the first terminal device may obtain the second session parameter by parsing the first message. Then, if the first terminal device determines that the first terminal device can support a session corresponding to the second session parameter, the first terminal device may determine the second session parameter as the first session parameter. Herein, that the first terminal device determines that the first terminal device can support a session corresponding to the second session parameter means that the first terminal device determines, based on performance and/or subscription information of the first terminal device, that the first terminal device can establish or use the session corresponding to the second session parameter. In this implementation, the first terminal device does not need to analyze the service performance of the second terminal device either, but only needs to determine, based on the second session parameter, whether the first terminal device has corresponding performance. Therefore, a process of determining the first session parameter is also relatively simple.

Optionally, if the first message received by the first terminal device includes the session parameter determining information, the first terminal device may obtain the session parameter determining information by parsing the first message, and then determine the first session parameter based on the session parameter determining information. For further content of the session parameter determining information, refer to the content in the foregoing embodiment. Details are not described herein again. In this implementation, a requirement on the service processing capability of the second terminal device is reduced, the second terminal device only needs to send the session parameter determining information to the first terminal device using the first message, and applicability is better.

Optionally, the first terminal device may alternatively negotiate with the second terminal device to determine the first session parameter based on the first message. For example, if the first terminal device determines, after obtaining the second session parameters by parsing the first message, that the first terminal device does not support one or more of the second session parameters, or if the first terminal device cannot support one or more of session parameters determined by the first terminal device based on the session parameter determining information, the first terminal device may negotiate with the second terminal device to determine the first session parameter. That the first terminal device does not support one or more of the second session parameters means that the first terminal device determines, based on session performance and/or the subscription information of the first terminal device, that at least one parameter in the second session parameters cannot be used or cannot be used to establish a session.

An example in which the first terminal device is a mobile phone and the second terminal device is a VR head mounted device is used below to describe a manner in which the first terminal device negotiates with the second terminal device to determine the first session parameter based on the first message. For example, a session that the VR head mounted device expects to use may meet a low-latency performance requirement, a high-bandwidth performance requirement, and a performance requirement of preferentially accessing a wireless local area network (WLAN). Therefore, the VR head mounted device sends a first message to the mobile phone. The first message includes a second session parameter or session parameter determining information that represents the low-latency performance, the high-bandwidth performance, and the performance of preferentially accessing a wireless local area network. After receiving the first message, the mobile phone determines, based on the first message, that a session required by the VR head mounted device needs to meet the low-latency performance, the high-bandwidth performance, and the performance of preferentially accessing a wireless local area network. In addition, the mobile phone learns, by analyzing performance and/or subscription information of the mobile phone, that the mobile phone cannot support the performance of preferentially accessing a wireless local area network, but can support performance of accessing a 3rd generation partnership project (3GPP) network. In this case, the mobile phone determines that a parameter that represents the low-latency performance, the high-bandwidth performance, and the performance of supporting access to a 3GPP network is a first session parameter, and sends a first response message to the second terminal device. The first response message includes the first session parameter, to notify the VR head mounted device of further content of the first session parameter.

In some optional application scenarios of this application, when the first terminal device forwards the data of the second terminal device, if the second terminal device further requires the first terminal device to send the data using a QoS flow that meets the service requirement of the second terminal device, before the first terminal device forwards the data of the second terminal device, the first terminal device further needs to determine a QoS parameter that meets the service requirement of the second terminal device, to further determine a QoS flow that meets the QoS parameter. In this application, for ease of distinguishing, the QoS parameter that is determined by the first terminal device and that meets the service requirement of the second terminal device is referred to as a first QoS parameter for short. The first terminal device determines, based on the first QoS parameter, to use an existing QoS flow or establish a new QoS flow.

It should be noted that a 5G communications system is used as an example for description in this embodiment of this application. Therefore, in this embodiment of this application, the QoS parameter may be replaced with a bearer parameter, and the first QoS parameter may be replaced with a first bearer parameter. Likewise, a second QoS parameter may also be replaced with a second bearer parameter below.

In some optional embodiments of this application, the first terminal device may receive a second message from the second terminal device, to further determine the first QoS parameter based on the received second message. There may be a plurality of manners in which the first terminal device receives the second message from the second terminal device. In some other embodiments, the first terminal device may alternatively determine the first QoS parameter using the first message.

For example, the second terminal device may independently determine, according to the service requirement of the second terminal device, a QoS parameter that meets the service requirement of the second terminal device, and then send the second message including the QoS parameter to the first terminal device. In this application, for ease of distinguishing, the QoS parameter that is determined by the second terminal device and that meets the service requirement of the second terminal device is referred to as a second QoS parameter for short. In other words, in this application scenario, the first terminal device may receive the second message from the second terminal device. The second message includes the second QoS parameter. After receiving the second message from the second terminal device, the first terminal device may obtain the second QoS parameter by parsing the second message, and then may determine the first QoS parameter based on the second QoS parameter without a need of analyzing the service requirement of the second terminal device. Therefore, efficiency of determining the first QoS parameter by the first terminal device is higher.

For example, the second terminal device cannot independently determine the second QoS parameters, or can determine only some parameters in the second QoS parameters. For example, when the service processing capability of the second terminal device is relatively weak, the second terminal device cannot determine the second QoS parameter. In this application scenario, the second terminal device may send, to the first terminal device using the second message, information used by the first terminal device to determine a QoS parameter of the second terminal device, so that the first terminal device can determine the first QoS parameter based on the information. In this application, for ease of description, the information used by the first terminal device to determine the QoS parameter of the second terminal device is referred to as QoS flow parameter determining information for short. In other words, in this application scenario, the first terminal device may alternatively receive the second message from the second terminal device. The second message includes the QoS flow parameter determining information. In this implementation, a requirement on the service processing capability of the second terminal device is reduced, the second terminal device only needs to send the QoS flow parameter determining information to the first terminal device using the second message, and applicability is better.

The QoS flow parameter determining information may include one or more of the following information:

Application information: The application information includes an application type or an application identifier used when a terminal device transmits data. Further, the application information includes an application type or an application identifier used to send or receive transmission data in the second terminal device. The application identifier herein includes an application ID or an application name.

Device performance information: The device performance information is used to indicate performance of the terminal device for transmitting data. Further, the device performance information is used to indicate the performance of the second terminal device.

Network access technology information: The network access technology information is used to indicate a network accessed by the terminal device. Further, the network access technology information is used to indicate a network technology supported for communication between the first terminal device and the second terminal device. The network technology herein includes Wi-Fi, PC5, BLUETOOTH, Wi-Fi, an ultra-wideband (UWB), near field communication (NFC), or the like.

Common performance information: The common performance information is used to indicate common performance supported by the terminal device. Further, the common performance information is used to indicate common performance supported by the first terminal device and the second terminal device. The common performance information includes one or more of the following information: compression coding scheme information and rendering capability information.

In some optional embodiments of this application, after receiving the second message, the first terminal device may alternatively determine the first QoS parameter based on the second message. There may also be a plurality of implementations in which the first terminal device determines the first QoS parameter based on the second message.

Optionally, if the second message received by the first terminal device includes the second QoS parameter, the first terminal device may obtain the second QoS parameter by parsing the second message, and then the first terminal device may determine the second QoS parameter as the first QoS parameter. In other words, the second terminal device may independently determine the first QoS parameter, and send the first QoS parameter to the first terminal device. In this implementation, a process in which the first terminal device determines the first QoS parameter is relatively simple, and service performance of the second terminal device does not need to be analyzed. Therefore, efficiency of determining the first QoS parameter is higher.

Optionally, if the second message received by the first terminal device includes the second QoS parameter, the first terminal device may obtain the second QoS parameter by parsing the second message. Then, if the first terminal device determines that the first terminal device can support a QoS parameter corresponding to the second QoS parameter, the first terminal device may determine the second QoS parameter as the first QoS parameter. Herein, that the first terminal device determines that the first terminal device can support a QoS parameter corresponding to the second QoS parameter means that the first terminal device determines, based on performance and/or subscription information of the first terminal device, that the first terminal device can establish or use the QoS parameter corresponding to the second QoS parameter. In this implementation, the first terminal device does not need to analyze the service performance of the second terminal device either, but only needs to determine whether the first terminal device supports the QoS parameter corresponding to the second QoS parameter. Therefore, a process of determining the first QoS parameter is relatively simple.

Optionally, if the second message received by the first terminal device includes the QoS flow parameter determining information, the first terminal device may obtain the QoS flow parameter determining information by parsing the second message, and then determine the first QoS flow parameter based on the QoS flow parameter determining information. For further content of the QoS flow parameter determining information, refer to the content in the foregoing embodiment. Details are not described herein again. In this implementation, a requirement on the service processing capability of the second terminal device is reduced, and applicability is better. Optionally, the first terminal device may alternatively negotiate with the second terminal device to determine the first QoS parameter based on the second message. For example, if the first terminal device determines, after obtaining second QoS parameters by parsing the second message, that the first terminal device does not support one or more of the second QoS parameters, or if the first terminal device does not support one or more of QoS parameters determined by the first terminal device based on the QoS flow parameter determining information, the first terminal device may further negotiate with the second terminal device to determine the first QoS parameter. That the first terminal device does not support one or more of the second QoS parameters means that the first terminal device determines, based on session performance and/or the subscription information of the first terminal device, that at least one parameter in the second QoS parameters cannot be used or cannot be used to establish a QoS flow.

An example in which the first terminal device is a mobile phone and the second terminal device is a VR head mounted device is still used below to describe a manner in which the first terminal device negotiates with the second terminal device to determine the first QoS parameter based on the second message. For example, a QoS parameter that the VR head mounted device expects to use meets a low-latency performance requirement, a high-bandwidth performance requirement, and a performance requirement of preferentially accessing a 3GPP network. Therefore, the VR head mounted device sends, to the mobile phone, a second message including a second QoS parameter or QoS flow parameter determining information corresponding to the low-latency performance, the high-bandwidth performance, and the performance of preferentially accessing a 3GPP network. After receiving the second message, the mobile phone determines, based on the second message, that a QoS parameter required by the VR head mounted device needs to meet the low-latency performance, the high-bandwidth performance, and the performance of preferentially accessing a 3GPP network. In addition, the mobile phone learns, by analyzing performance and/or subscription information of the mobile phone, that the mobile phone cannot support the performance of preferentially accessing a 3GPP network, but can support performance of accessing a wireless local area network. In this case, the mobile phone determines that a parameter that represents the low-latency performance, the high-bandwidth performance, and the performance of supporting access to a wireless local area network is a first QoS parameter, and sends a second response message to the second terminal device. The second response message includes the first QoS parameter, to notify the VR head mounted device of further content of the first QoS parameter.

It should be noted that the second terminal device may simultaneously or separately provide a session requirement and a QoS flow requirement of the second terminal device for the first terminal device. In other words, the first terminal device may determine the first session parameter and the first QoS parameter using one message, or may respectively determine the first session parameter and the first QoS parameter using two different messages. Therefore, the second message may be the first message, or may be a message different from the first message. This is not limited in this application.

It should be noted that, in this embodiment of this application, the first terminal device may alternatively determine the first QoS parameter by parsing the first message. For example, the second terminal device may determine the first QoS parameter, and send the first QoS parameter to the first terminal device using the first message. For another example, the second terminal device may determine the QoS flow parameter determining information, and send the QoS flow parameter determining information to the first terminal device using the first message.

In some other embodiments, the first terminal device may alternatively determine the first QoS parameter using the session parameter determining information or the second session parameter. For example, the first terminal device may determine a service type of the second terminal device using the session parameter determining information, for example, determine whether the second terminal device wants to transmit a video service or a text service. After determining the service type, the first terminal device may independently determine the first QoS parameter.

When the second message is a message different from the first message, a time at which the first terminal device receives the first message is earlier than a time at which the first terminal device receives the second message. For details, refer to content in the following embodiments. Details are not described herein again.

In the session parameter determining method provided in this implementation, the first terminal device performs signaling interaction with the second terminal device using a message. After receiving the first message from the second terminal device, the first terminal device may determine, based on the first message, the session parameter of the session that meets the service requirement of the second terminal device, then determine, based on the session parameter, the session that meets the service requirement of the second terminal device, and forward the data of the second terminal device to the network device using the session that meets the service requirement of the second terminal device. This improves data transmission efficiency.

Figure 5:
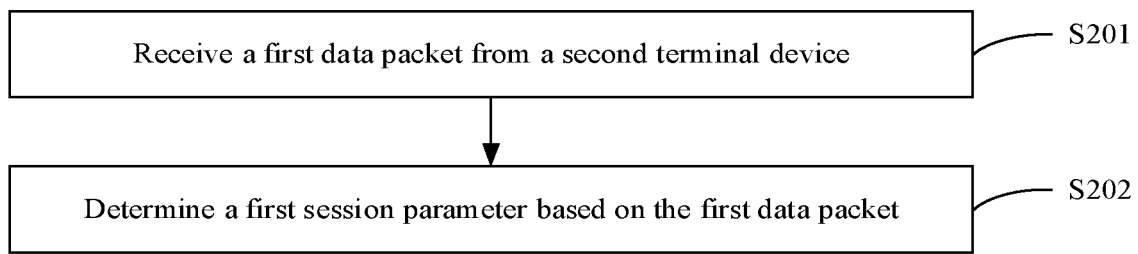
FIG. 5 is a schematic flowchart of another implementation of a session parameter determining method according to this application.

FIG. 5 is a schematic flowchart of another implementation of a session parameter determining method according to this application. The method is applied to a first terminal device, and includes the following steps.

Step S201: Receive a first data packet from a second terminal device.

In some other optional application scenarios of this application, signaling interaction is performed between the first terminal device and the second terminal device by sending and receiving data packets. For example, when the first terminal device and the second terminal device perform communication connection through BLUETOOTH, Wi-Fi, UWB, or NFC, signaling interaction is performed between the first terminal device and the second terminal device by sending and receiving data packets. For example, the mobile phone and the VR head mounted device shown in the foregoing embodiment may perform communication connection through BLUETOOTH, Wi-Fi, UWB, or NFC. In this application scenario, the first terminal device may further receive the first data packet from the second terminal device, to further determine a first session parameter based on the received first data packet. There may also be a plurality of manners in which the first terminal device receives the first data packet from the second terminal device.

Optionally, if the second terminal device may independently determine a second session parameter, the first terminal device may receive the first data packet from the second terminal device. The first data packet includes the second session parameter. After receiving the first data packet from the second terminal device, the first terminal device may obtain the second session parameter by parsing the first data packet, and then may determine the first session parameter based on the second session parameter without a need of analyzing service requirement of the second terminal device. Therefore, efficiency of determining a first session parameter by the first terminal device is higher.

Optionally, if the second terminal device cannot independently determine the second session parameter, the first terminal device may receive the first data packet from the second terminal device. The first data packet includes session parameter determining information. For further content of the session parameter determining information, refer to the content in the foregoing embodiment. In this implementation, a requirement on a service processing capability of the second terminal device is relatively low, and applicability is better.

Step S202: Determine the first session parameter based on the first data packet.

In this application, there may be a plurality of implementations of determining the first session parameter based on the first data packet.

Optionally, if the first data packet received by the first terminal device includes the second session parameter, the first terminal device may obtain the second session parameter by parsing the first data packet, and then the first terminal device may determine the second session parameter as the first session parameter. In this implementation, a process in which the first terminal device determines the first session parameter is relatively simple, and service performance of the second terminal device does not need to be analyzed. Therefore, efficiency of determining the first session parameter is higher.

Optionally, if the first data packet received by the first terminal device includes the second session parameter, the first terminal device may obtain the second session parameter by parsing the first data packet. Then, if the first terminal device determines that the first terminal device can support a session corresponding to the second session parameter, the first terminal device may determine the second session parameter as the first session parameter. In this implementation, the first terminal device does not need to analyze the service performance of the second terminal device either, but only needs to determine, based on the second session parameter, whether the first terminal device has corresponding performance. Therefore, a process of determining the first session parameter is also relatively simple.

Optionally, if the first data packet received by the first terminal device includes the session parameter determining information, the first terminal device may obtain the session parameter determining information by parsing the first data packet, and then determine the first session parameter based on the session parameter determining information. For further content of the session parameter determining information, refer to the content in the foregoing embodiment. In this implementation, a requirement on the service processing capability of the second terminal device is reduced, the second terminal device only needs to send the session parameter determining information to the first terminal device using the first data packet, and applicability is better.

Optionally, the first terminal device may alternatively negotiate with the second terminal device to determine the first session parameter based on the first data packet. For example, if the first terminal device determines, after obtaining second session parameters by parsing the first data packet, that the first terminal device does not support one or more of the second session parameters, or if the first terminal device cannot support one or more of session parameters determined by the first terminal device based on the session parameter determining information, the first terminal device may negotiate with the second terminal device to determine the first session parameter.

An example in which the first terminal device is a mobile phone and the second terminal device is a VR head mounted device is still used below to describe a manner in which the first terminal device negotiates with the second terminal device to determine the first session parameter based on the first data packet. For example, a session that the VR head mounted device expects to use may meet a low-latency performance requirement, a high-bandwidth performance requirement, and a performance requirement of preferentially accessing a wireless local area network (WLAN). Therefore, the VR head mounted device sends a first data packet to the mobile phone. The first data packet includes a second session parameter or session parameter determining information that represents the low-latency performance, the high-bandwidth performance, and the performance of preferentially accessing a wireless local area network. After receiving the first data packet, the mobile phone determines, based on the first data packet, that a session required by the VR head mounted device needs to meet the low-latency performance, the high-bandwidth performance, and the performance of preferentially accessing a wireless local area network. In addition, the mobile phone learns, by analyzing performance and/or subscription information of the mobile phone, that the mobile phone cannot support the performance of preferentially accessing a wireless local area network, but can support performance of accessing a 3rd generation partnership project (3GPP) network. In this case, the mobile phone determines that a parameter that represents the low-latency performance, the high-bandwidth performance, and the performance of supporting access to a 3GPP network is a first session parameter, and sends a third data packet to the second terminal device. The third data packet includes the first session parameter, to notify the VR head mounted device of further content of the first session parameter.

In some optional embodiments of this application, the first terminal device may receive a second data packet from the second terminal device, to further determine the first QoS parameter based on the received second data packet. There may also be a plurality of manners in which the first terminal device receives the second data packet from the second terminal device.

Optionally, if the second terminal device may independently determine a second QoS parameter, the first terminal device may receive the second data packet from the second terminal device. The second data packet includes the second QoS parameter. After receiving the second data packet from the second terminal device, the first terminal device may obtain the second QoS parameter by parsing the second data packet, and then may determine the first QoS parameter based on the second QoS parameter without a need of analyzing the service requirement of the second terminal device. Therefore, efficiency of determining the first QoS parameter by the first terminal device is higher.

Optionally, if the second terminal device cannot independently determine the second QoS parameter, the first terminal device may receive the first data packet from the second terminal device. The first data packet includes QoS flow parameter determining information. For further content of the QoS flow parameter determining information, refer to the content in the foregoing embodiment. Details are not described herein again. In this implementation, a requirement on a service processing capability of the second terminal device is relatively low, and applicability is better.

In some optional embodiments of this application, after receiving the second data packet, the first terminal device may alternatively determine the first QoS parameter based on the second data packet. There may also be a plurality of implementations in which the first terminal device determines the first QoS parameter based on the second data packet.

Optionally, if the second data packet received by the first terminal device includes the second QoS parameter, the first terminal device may obtain the second QoS parameter by parsing the second data packet, and then the first terminal device may determine the second QoS parameter as the first QoS parameter. In this implementation, a process in which the first terminal device determines the first QoS parameter is relatively simple, and service performance of the second terminal device does not need to be analyzed. Therefore, efficiency of determining the first QoS parameter is higher.

Optionally, if the second data packet received by the first terminal device includes the second QoS parameter, the first terminal device may obtain the second QoS parameter by parsing the second data packet. Then, if the first terminal device determines that the first terminal device can support a QoS parameter corresponding to the second QoS parameter, the first terminal device may determine the second QoS parameter as the first QoS parameter. In this implementation, the first terminal device does not need to analyze the service performance of the second terminal device either, but only needs to determine whether the first terminal device supports the QoS parameter corresponding to the second QoS parameter. Therefore, a process of determining the first QoS parameter is relatively simple.

Optionally, if the second data packet received by the first terminal device includes the QoS flow parameter determining information, the first terminal device may obtain the QoS flow parameter determining information by parsing the second data packet, and then determine the first QoS parameter based on the QoS flow parameter determining information. For further content of the QoS flow parameter determining information, refer to the content in the foregoing embodiment. Details are not described herein again. In this implementation, a requirement on the service processing capability of the second terminal device is reduced, and applicability is better.

Optionally, the first terminal device may alternatively negotiate with the second terminal device to determine the first QoS parameter based on the second data packet. For example, if the first terminal device determines, after obtaining second QoS parameters by parsing the second data packet, that the first terminal device does not support one or more of the second QoS parameters, or if the first terminal device does not support one or more of QoS parameters determined by the first terminal device based on the QoS flow parameter determining information, the first terminal device may further negotiate with the second terminal device to determine the first QoS parameter.

It should be noted that, in this embodiment of this application, the first terminal device and the second terminal device may determine a session parameter of a current service using one data packet or using a plurality of data packets. Alternatively, the second terminal device may add a special field to a data packet to indicate a session parameter.

In some embodiments, the first terminal device and the second terminal device may establish a plurality of services, and the services may require different sessions. In this case, the first terminal device and the second terminal device may determine parameters of a plurality of sessions. After configuring the plurality of sessions with a network device, the first terminal device may send corresponding session identifiers to the second terminal device. When sending a data packet to the first terminal device, the second terminal device may add a corresponding session identifier to the data packet, to indicate a session or a QoS flow to which the data packet belongs.

An example in which the first terminal device is a mobile phone and the second terminal device is a VR head mounted device is still used below to describe a manner in which the first terminal device negotiates with the second terminal device to determine the first QoS parameter based on the second data packet. For example, a QoS parameter that the VR head mounted device expects to use meets a low-latency performance requirement, a high-bandwidth performance requirement, and a performance requirement of preferentially accessing a 3GPP network. Therefore, the VR head mounted device sends, to the mobile phone, a second data packet including a second QoS parameter or QoS flow parameter determining information corresponding to the low-latency performance, the high-bandwidth performance, and the performance of preferentially accessing a 3GPP network. After receiving the second data packet, the mobile phone determines, based on the second data packet, that a QoS parameter required by the VR head mounted device needs to meet the low-latency performance, the high-bandwidth performance, and the performance of preferentially accessing a 3GPP network. In addition, the mobile phone learns, by analyzing performance and/or subscription information of the mobile phone, that the mobile phone cannot support the performance of preferentially accessing a 3GPP network, but can support performance of accessing a wireless local area network. In this case, the mobile phone determines that a parameter that represents the low-latency performance, the high-bandwidth performance, and the performance of supporting access to a wireless local area network is a first QoS parameter, and sends a fourth data packet to the second terminal device. The fourth data packet includes the first QoS parameter, to notify the VR head mounted device of further content of the first QoS parameter.

It should be noted that the first terminal device may determine the first session parameter and the first QoS parameter using one data packet, or may respectively determine the first session parameter and the first QoS parameter using two different data packets. Therefore, the second data packet may be the first data packet, or may be a data packet different from the first data packet. This is not limited in this application. When the second data packet is a data packet different from the first data packet, a time at which the first terminal device receives the first data packet is earlier than a time at which the first terminal device receives the second data packet. For details, refer to content in the following embodiments. Details are not described herein again.

In the session parameter determining method provided in this implementation, the first terminal device performs signaling interaction with the second terminal device using a data packet. After receiving the first data packet from the second terminal device, the first terminal device may determine, based on the first data packet, a session parameter of a session that meets a service requirement of the second terminal device, then determine, based on the session parameter, the session that meets the service requirement of the second terminal device, and forward data of the second terminal device to the network device using the session that meets the service requirement of the second terminal device. This improves data transmission efficiency.

Figure 6:
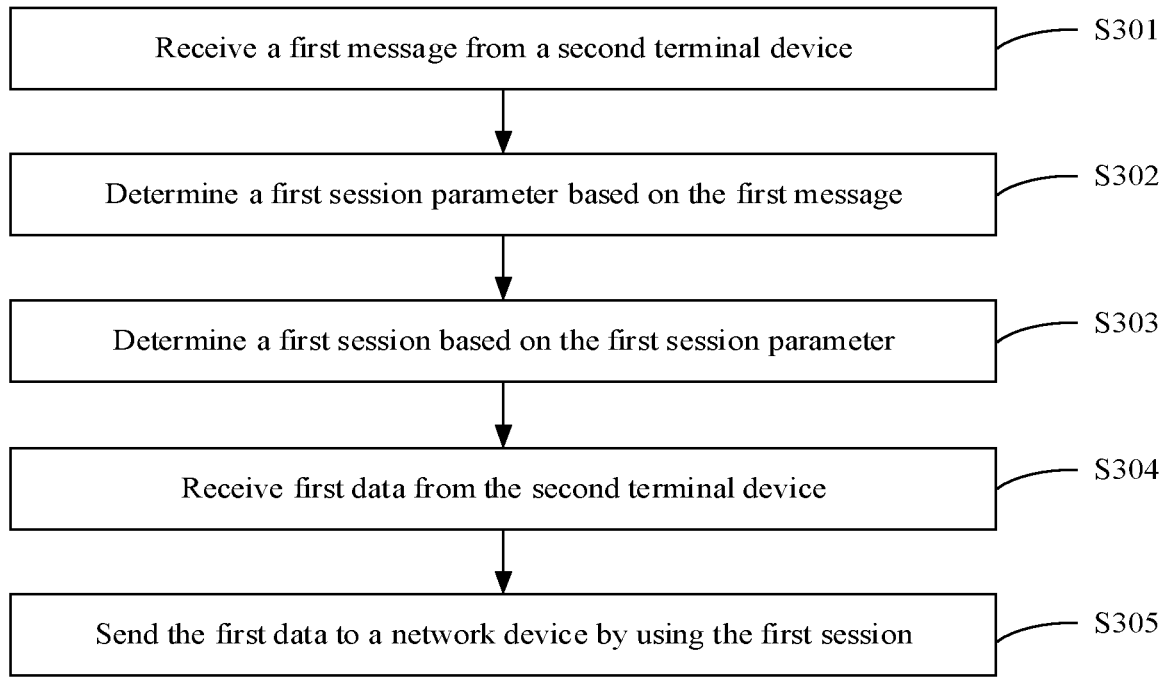
FIG. 6 is a schematic flowchart of an implementation of a data transmission method according to this application.

FIG. 6 is a schematic flowchart of an implementation of a data transmission method according to this application. The method is applied to a first terminal device, and includes the following steps.

Step S301: Receive a first message from a second terminal device.

Step S302: Determine a first session parameter based on the first message.

For further implementations of step S301 and step S302, refer to content of the embodiment shown in FIG. 4. Details are not described herein again.

Step S303: Determine a first session based on the first session parameter.

In this application, there may be a plurality of implementations of determining the first session based on the first session parameter.

Optionally, after determining the first session parameter, the first terminal device may send a session establishment request message to a network device. The session establishment request message includes the first session parameter. Then, the first terminal device receives a session establishment response message sent by the network device. The session establishment response message includes one or more first session parameters. Finally, the first terminal device establishes the first session between the first terminal device and the network device based on the session establishment response message. In this implementation, after determining the first session parameter, the first terminal device directly requests, based on the first session parameter, the network device to establish the first session between the first terminal device and the network device. Therefore, a process is relatively simple, and the first session can be determined more quickly.

Optionally, the session establishment response message in this embodiment of this application may be a PDU session establishment accept.

Optionally, after determining the first session parameter, the first terminal device may first determine whether there is a second session that matches the first session parameter, in other words, determine whether there is a second session that can meet a service performance requirement corresponding to the first session parameter. If the first terminal device determines that there is no second session that matches the first session parameter, the first terminal device may send a session establishment request message to the network device. The session establishment request message includes the first session parameter. Then, the first terminal device receives a session establishment response message sent by the network device. The session establishment response message includes one or more first session parameters. Finally, the first terminal device establishes the first session between the first terminal device and the network device based on the session establishment response message. In this implementation, only when determining that there is no second session that matches the first session parameter, the first terminal device requests, based on the first session parameter, the network device to establish the first session between the first terminal device and the network device. This can avoid a waste of network resources, and improve network resource utilization.

Optionally, after determining the first session parameter, the first terminal device may first determine whether there is a second session that matches the first session parameter, in other words, determine whether there is a second session that can meet a service performance requirement corresponding to the first session parameter. If the first terminal device determines that there is the second session that matches the first session parameter, the first terminal device determines the second session as the first session. In this implementation, only when determining that there is the second session that matches the first session parameter, the first terminal device determines the second session as the first session, and does not request the network device to establish the first session between the first terminal device and the network device. This can avoid a waste of network resources, and improve network resource utilization.

The second session is a session that has been established between the first terminal device and the network device, and may be a currently activated session, in other words, the first terminal device may use the session to send and receive data, or may be an inactivated session, that is, a session that can be activated to send and receive data when the session needs to be used.

Step S304: Receive first data from the second terminal device.

In some optional application scenarios of this application, after the second terminal device sends the first message to the first terminal device, if it is determined that the first session can meet a service requirement of the first data, the second terminal device sends the first data to the first terminal device.

In some other optional application scenarios of this application, the second terminal device may further send any piece of first data that is not limited by the service requirement to the first terminal device.

In some other optional application scenarios of this application, the first terminal device determines a session identifier of the first session. A determining method includes: The first terminal device obtains the session identifier of the first session by parsing the session establishment response message sent by the network device or determines the session identifier of the first session based on locally stored information, and then sends the session identifier of the first session to the second terminal device. After receiving the session identifier of the first session sent by the first terminal device, if the second terminal device needs to send the first data using the first session, the second terminal device may send the first data including the session identifier of the first session to the first terminal device. In this application scenario, the first terminal device may receive the first data from the second terminal device. The first data includes the session identifier of the first session.

Step S305: Send the first data to the network device using the first session.

Optionally, after receiving the first data from the second terminal device, the first terminal device does not parse the first data, but directly sends the first data to the network device using the first session.

Optionally, after receiving the first data, the first terminal device first parses the first data to obtain the session identifier of the first session, then determines the first session based on the session identifier, and sends the first data to the network device using the first session.

In some optional embodiments, the second terminal device corresponds to only one session, and the first terminal device records the first session used by the second terminal device. In this case, the first data may not carry the session identifier of the first session, and the first terminal device directly sends the first data to the network device using the first session corresponding to the second terminal device.

In some optional embodiments, the data transmission method may further include receiving a second message from the second terminal device, determining a first QoS parameter based on the second message, and determining a first QoS flow in the first session based on the first QoS parameter. In this implementation scenario, step S305 may include sending the first data to the network device using the first QoS flow.

For a further implementation of receiving the second message from the second terminal device and determining the first QoS parameter based on the second message, refer to content in the foregoing embodiment. Details are not described herein again.

There may be a plurality of implementations of determining the first QoS flow in the first session based on the first QoS parameter.

Optionally, the first terminal device may determine the first session parameter and the first QoS parameter based on one message, for example, the first message. Based on this, if the first terminal device determines the first session parameter and the first QoS parameter based on the first message, when the first terminal device sends a session establishment request message to the network device, the session establishment request message may further include the first QoS parameter. In this case, a received session establishment response message sent by the network device further includes one or more first QoS parameters, and the first terminal device may further establish the first QoS flow in the established first session based on the session establishment response message. In this implementation, not only the first session may be determined, but also the first QoS flow may be determined in the first session. This can better meet a service requirement of a terminal device.

In this application, establishing the first QoS flow in the first session may be understood as that the first QoS flow belongs to the first session or the first QoS flow is associated with the first session.

Optionally, if the first terminal device determines the first session parameter and the first QoS parameter based on the first message, and the first session is a second session that matches the first session parameter, the first terminal device first obtains a session identifier of the second session, and then sends a first session modification request message to the network device. The first session modification request message includes the session identifier of the second session and the first QoS parameter. The first terminal device requests the network device to modify the second session, and receives a first session modification response message sent by the network device. The first session modification response message includes the session identifier of the second session and one or more first QoS parameters. Then, the first terminal device establishes the first QoS flow between the first terminal device and the network device in the second session based on the first session modification response message. In this implementation, the first terminal device directly requests, based on the determined first QoS parameter, the network device to establish the first QoS flow in the second session. Therefore, a process is relatively simple, and the first session and the first QoS flow can be determined more quickly.

Optionally, the first session modification response message in this embodiment of this application may be a PDU session modification command.

In this application, establishing the first QoS flow in the second session may be understood as that the first QoS flow belongs to the second session or the first QoS flow is associated with the second session.

Optionally, if the first terminal device determines the first session parameter and the first QoS parameter based on the first message, and the first session is a second session that matches the first session parameter, the first terminal device first determines whether the second session includes a second QoS flow that matches the first QoS parameter. If the first terminal device determines that the second session includes the second QoS flow that matches the first QoS parameter, the first terminal device determines the second QoS flow as the first QoS flow, or if the first terminal device determines that the second session does not include the second QoS flow that matches the first QoS parameter, the first terminal device obtains a session identifier of the second session, and then sends a first session modification request message to the network device. The first session modification request message includes the session identifier of the second session and the first QoS parameter. The first terminal device requests the network device to modify the second session, and then receives a first session modification response message sent by the network device. The first session modification response message includes the session identifier of the second session and one or more first QoS parameters. Finally, the first terminal device establishes the first QoS flow between the first terminal device and the network device in the second session based on the first session modification response message. In this implementation, when determining that the second session includes the second QoS flow that matches the first QoS parameter, the first terminal device determines the second QoS flow as the first QoS flow, or when determining that the second session does not include the second QoS flow that matches the first QoS parameter, the first terminal device requests, based on the first QoS parameter, the network device to establish the first QoS flow between the first terminal device and the network device. This can avoid a waste of network resources, and improve network resource utilization.

Optionally, if the first terminal device determines the first session parameter based on the first message and determines the first QoS parameter based on the second message, and the second message is a message different from the first message, after the first terminal device determines the first session based on the first session parameter, the first terminal device further sends the session identifier of the first session to the second terminal device, and the received second message sent by the second terminal device further includes the session identifier of the first session. Then, after the first terminal device receives the second message and determines the first QoS parameter based on the second message, the first terminal device sends a first session modification request message to the network device. The first session modification request message includes the session identifier of the first session and the first QoS parameter. The first terminal device requests the network device to modify the first session, and then receives a first session modification response message sent by the network device. The first session modification response message includes the session identifier of the first session and one or more first QoS parameters. Finally, the first terminal device establishes the first QoS flow between the first terminal device and the network device in the first session based on the first session modification response message.

Optionally, if the first terminal device determines the first session parameter based on the first message and determines the first QoS parameter based on the second message, and the second message is a message different from the first message, after the first terminal device determines the first session based on the first session parameter, the first terminal device further sends the session identifier of the first session to the second terminal device, and the received second message sent by the second terminal device further includes the session identifier of the first session. Then, after the first terminal device receives the second message and determines the first QoS parameter based on the second message, the first terminal device first determines whether the first session includes a second QoS flow that matches the first QoS parameter. If the first terminal device determines that the first session includes the second QoS flow that matches the first QoS parameter, the first terminal device determines the second QoS flow as the first QoS flow, or if the first terminal device determines that the first session does not include the second QoS flow that matches the first QoS parameter, the first terminal device sends a first session modification request message to the network device. The first session modification request message includes the session identifier of the first session and the first QoS parameter. The first terminal device requests the network device to modify the first session, and then receives a first session modification response message sent by the network device. The first session modification response message includes the session identifier of the first session and one or more first QoS parameters. Finally, the first terminal device establishes the first QoS flow between the first terminal device and the network device in the first session based on the first session modification response message.

The second QoS flow is a QoS flow that has been established in the first session, and may be a currently activated QoS flow that is being used by the first terminal device, or may be an inactivated QoS flow that can be activated when the QoS flow needs to be used.

Optionally, the first QoS parameter may further include a QoS rule parameter. The first terminal device may further add a QoS rule corresponding to the QoS rule parameter to the established first QoS flow based on the session establishment response message or the first session modification response message. The QoS rule is a QoS rule corresponding to data of the second terminal device. The QoS rule includes one or more of the following information: a packet filter set (Packet Filter Set) and a QFI.

Optionally, if the first QoS parameter includes a QoS rule parameter, and the second QoS flow that matches the first QoS parameter in the first session is the first QoS flow, after the first terminal device determines the first QoS flow, the first terminal device obtains the session identifier of the first session and a QoS flow identifier of the first QoS flow, and then sends a second session modification request message to the network device. The second session modification request message includes the session identifier of the first session, the QoS flow identifier of the first QoS flow, and the QoS rule parameter. The first terminal device requests the network device to modify the first session, and then receives a second session modification response message sent by the network device. The second session modification response message includes the session identifier of the first session, the QoS flow identifier of the first QoS flow, and the QoS rule parameter. Finally, the first terminal device adds a QoS rule corresponding to the QoS rule parameter to the first QoS flow based on the second session modification response message. The QoS rule is a QoS rule corresponding to the data of the second terminal device.

Optionally, the second session modification response message in this embodiment of this application may be a PDU session modification command.

Optionally, if the first QoS parameter includes a QoS rule parameter, and the second QoS flow that matches the first QoS parameter in the first session is the first QoS flow, after the first terminal device determines the first QoS flow, the first terminal device first determines whether the first QoS flow includes a QoS rule corresponding to the QoS rule parameter. If the first QoS flow does not include the QoS rule corresponding to the QoS rule parameter, the first terminal device first obtains the session identifier of the first session and a QoS flow identifier of the first QoS flow, and then sends a second session modification request message to the network device. The second session modification request message includes the session identifier of the first session, the QoS flow identifier of the first QoS flow, and the QoS rule parameter. The first terminal device requests the network device to modify the first session, and then receives a second session modification response message sent by the network device. The second session modification response message includes the session identifier of the first session, the QoS flow identifier of the first QoS flow, and the QoS rule parameter. Finally, the first terminal device adds the QoS rule corresponding to the QoS rule parameter to the first QoS flow based on the second session modification response message. The QoS rule is a QoS rule corresponding to the second terminal device.

Optionally, the first terminal device may further send the session identifier of the first session and the QoS flow identifier of the first QoS flow to the second terminal device, and receive second data from the second terminal device. The second data includes the session identifier of the first session and the QoS flow identifier of the first QoS flow. After receiving the second data, the first terminal device sends the second data to the network device using the first QoS flow.

Optionally, the first terminal device may further establish a communications link with the second terminal device, and establish a correspondence between the communications link and the first QoS flow. Then, after receiving third data sent by the second terminal device through the communications link, the first terminal device may send the third data to the network device based on the correspondence using the first QoS flow.

In the data transmission method provided in this implementation, the first terminal device performs signaling interaction with the second terminal device using a message.

After receiving the first message from the second terminal device, the first terminal device may determine, based on the first message, the first session parameter that meets a service requirement of the second terminal device, then determine, based on the first session parameter, the first session that meets the service requirement of the second terminal device, and finally forward the data of the second terminal device to the network device using the first session that meets the service requirement of the second terminal device. This improves data transmission efficiency.

Figure 7:
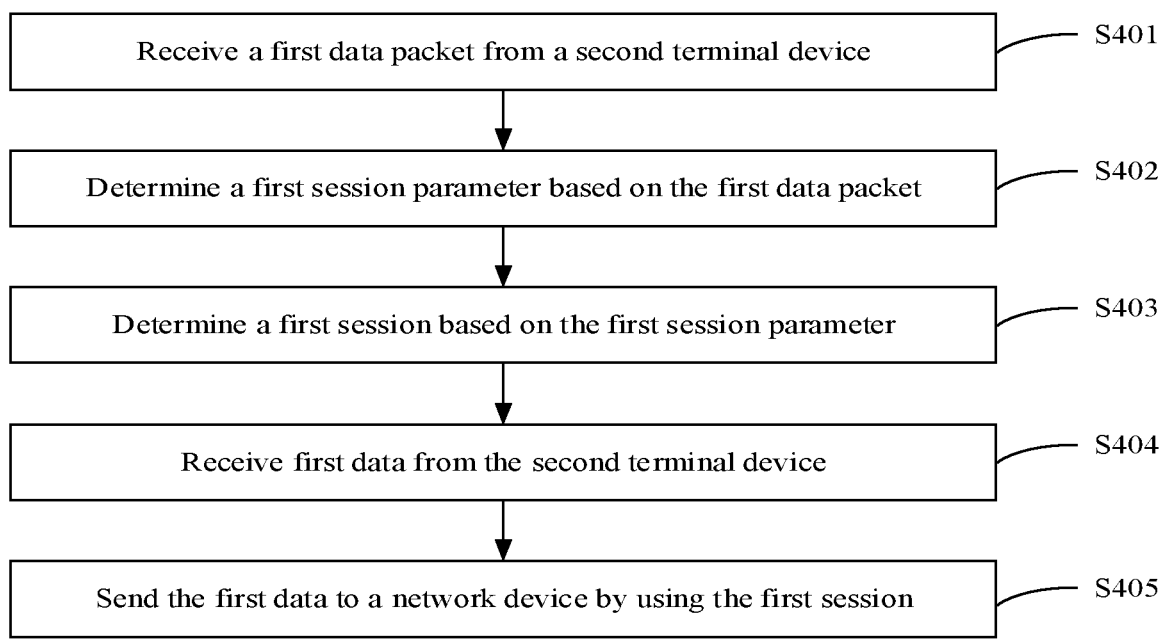
FIG. 7 is a schematic flowchart of another implementation of a data transmission method according to this application.

FIG. 7 is a schematic flowchart of another implementation of a data transmission method according to this application. The method is applied to a first terminal device, and includes the following steps.

Step S401: Receive a first data packet from a second terminal device.

Step S402: Determine a first session parameter based on the first data packet.

For implementations of step S401 and step S402, refer to content of the embodiment shown in FIG. 5. Details are not described herein again.

Step S403: Determine a first session based on the first session parameter.

In this application, there may be a plurality of implementations of determining the first session based on the first session parameter.

Optionally, after determining the first session parameter, the first terminal device may send a session establishment request message to a network device. The session establishment request message includes the first session parameter. Then, the first terminal device receives a session establishment response message sent by the network device. The session establishment response message includes one or more first session parameters. Finally, the first terminal device establishes the first session between the first terminal device and the network device based on the session establishment response message. In this implementation, after determining the first session parameter, the first terminal device directly requests, based on the first session parameter, the network device to establish the first session between the first terminal device and the network device. Therefore, a process is relatively simple, and the first session can be determined more quickly.

Optionally, after determining the first session parameter, the first terminal device may first determine whether there is a second session that matches the first session parameter, in other words, determine whether there is a second session that can meet a service performance requirement corresponding to the first session parameter. If the first terminal device determines that there is no second session that matches the first session parameter, the first terminal device may send a session establishment request message to the network device. The session establishment request message includes the first session parameter. Then, the first terminal device receives a session establishment response message sent by the network device. The session establishment response message includes one or more first session parameters. Finally, the first terminal device establishes the first session between the first terminal device and the network device based on the session establishment response message. In this implementation, only when determining that there is no second session that matches the first session parameter, the first terminal device requests, based on the first session parameter, the network device to establish the first session between the first terminal device and the network device. This can avoid a waste of network resources, and improve network resource utilization.

Optionally, after determining the first session parameter, the first terminal device may first determine whether there is a second session that matches the first session parameter, in other words, determine whether there is a second session that can meet a service performance requirement corresponding to the first session parameter. If the first terminal device determines that there is the second session that matches the first session parameter, the first terminal device determines the second session as the first session. In this implementation, only when determining that there is the second session that matches the first session parameter, the first terminal device determines the second session as the first session, and does not request the network device to establish the first session between the first terminal device and the network device. This can avoid a waste of network resources, and improve network resource utilization.

The second session is a session that has been established between the first terminal device and the network device, and may be a currently activated session, in other words, the first terminal device may use the session to send and receive data, or may be an inactivated session, that is, a session that can be activated to send and receive data when the session needs to be used.

S404: Receive first data from the second terminal device.

In some optional application scenarios of this application, after the second terminal device sends the first data packet to the first terminal device, if it is determined that the first session can meet a service requirement of the first data, the second terminal device sends the first data to the first terminal device.

In some other optional application scenarios of this application, the second terminal device may further send any piece of first data that is not limited by the service requirement to the first terminal device.

In some other optional application scenarios of this application, the first terminal device may further obtain a session identifier of the first session by parsing the session establishment response message sent by the network device, and then send the session identifier of the first session to the second terminal device. After receiving the session identifier of the first session sent by the first terminal device, if the second terminal device needs to send the first data using the first session, the second terminal device may send the first data including the session identifier of the first session to the first terminal device. In this application scenario, the first terminal device may receive the first data from the second terminal device. The first data includes the session identifier of the first session.

Step S405: Send the first data to the network device using the first session.

Optionally, after receiving the first data from the second terminal device, the first terminal device does not parse the first data, but directly sends the first data to the network device using the first session.

Optionally, after receiving the first data, the first terminal device first parses the first data to obtain the session identifier of the first session, then determines the first session based on the session identifier, and sends the first data to the network device using the first session.

In some optional embodiments, the data transmission method may further include receiving a second data packet from the second terminal device, determining a first QoS parameter based on the second data packet, and determining a first QoS flow in the first session based on the first QoS parameter. In this implementation scenario, step S405 may include: sending the first data to the network device using the first QoS flow.

For an implementation of receiving the second data packet from the second terminal device and determining the first QoS parameter based on the second data packet, refer to content in the foregoing embodiment. Details are not described herein again.

There may be a plurality of implementations of determining the first QoS flow in the first session based on the first QoS parameter.

Optionally, the first terminal device may determine the first session parameter and the first QoS parameter based on one data packet, for example, the first data packet. Based on this, if the first terminal device determines the first session parameter and the first QoS parameter based on the first data packet, when the first terminal device sends a session establishment request message to the network device, the session establishment request message may further include the first QoS parameter. In this case, a received session establishment response message sent by the network device further includes one or more first QoS parameters, and the first terminal device may further establish the first QoS flow in the established first session based on the session establishment response message.

Optionally, if the first terminal device determines the first session parameter and the first QoS parameter based on the first data packet, and the first session is a second session that matches the first session parameter, the first terminal device first obtains a session identifier of the second session, and then sends a first session modification request message to the network device. The first session modification request message includes the session identifier of the second session and the first QoS parameter. The first terminal device requests the network device to modify the second session, and receives a first session modification response message sent by the network device. The first session modification response message includes the session identifier of the second session and one or more first QoS parameters. Then, the first terminal device establishes the first QoS flow between the first terminal device and the network device in the second session based on the first session modification response message.

Optionally, if the first terminal device determines the first session parameter and the first QoS parameter based on the first data packet, and the first session is a second session that matches the first session parameter, the first terminal device first determines whether the second session includes a second QoS flow that matches the first QoS parameter. If the first terminal device determines that the second session includes the second QoS flow that matches the first QoS parameter, the first terminal device determines the second QoS flow as the first QoS flow, or if the first terminal device determines that the second session does not include the second QoS flow that matches the first QoS parameter, the first terminal device obtains a session identifier of the second session, and then sends a first session modification request message to the network device. The first session modification request message includes the session identifier of the second session and the first QoS parameter. The first terminal device requests the network device to modify the second session, and then receives a first session modification response message sent by the network device. The first session modification response message includes the session identifier of the second session and one or more first QoS parameters. Finally, the first terminal device establishes the first QoS flow between the first terminal device and the network device in the second session based on the first session modification response message.

Optionally, if the first terminal device determines the first session parameter based on the first data packet and determines the first QoS parameter based on the second data packet, and the second data packet is a data packet different from the first data packet, after the first terminal device determines the first session based on the first session parameter, the first terminal device further sends the session identifier of the first session to the second terminal device, and the received second data packet sent by the second terminal device further includes the session identifier of the first session. Then, after the first terminal device receives the second data packet and determines the first QoS parameter based on the second data packet, the first terminal device sends a first session modification request message to the network device. The first session modification request message includes the session identifier of the first session and the first QoS parameter. The first terminal device requests the network device to modify the first session, and then receives a first session modification response message sent by the network device. The first session modification response message includes the session identifier of the first session and one or more first QoS parameters. Finally, the first terminal device establishes the first QoS flow between the first terminal device and the network device in the first session based on the first session modification response message.

Optionally, if the first terminal device determines the first session parameter based on the first data packet and determines the first QoS parameter based on the second data packet, and the second data packet is a data packet different from the first data packet, after the first terminal device determines the first session based on the first session parameter, the first terminal device further sends the session identifier of the first session to the second terminal device, and the received second data packet sent by the second terminal device further includes the session identifier of the first session. Then, after the first terminal device receives the second data packet and determines the first QoS parameter based on the second data packet, the first terminal device first determines whether the first session includes a second QoS flow that matches the first QoS parameter. If the first terminal device determines that the first session includes the second QoS flow that matches the first QoS parameter, the first terminal device determines the second QoS flow as the first QoS flow, or if the first terminal device determines that the first session does not include the second QoS flow that matches the first QoS parameter, the first terminal device sends a first session modification request message to the network device. The first session modification request message includes the session identifier of the first session and the first QoS parameter. The first terminal device requests the network device to modify the first session, and then receives a first session modification response message sent by the network device. The first session modification response message includes the session identifier of the first session and one or more first QoS parameters. Finally, the first terminal device establishes the first QoS flow between the first terminal device and the network device in the first session based on the first session modification response message.

The second QoS flow is a QoS flow that has been established in the first session, and may be a currently activated QoS flow that is being used by the first terminal device, or may be an inactivated QoS flow that can be activated when the QoS flow needs to be used.

Optionally, the first QoS parameter may further include a QoS rule parameter. The first terminal device may further add a QoS rule corresponding to the QoS rule parameter to the established first QoS flow based on the session establishment response message or the first session modification response message. The QoS rule is a QoS rule corresponding to the second terminal device.

Optionally, if the first QoS parameter includes a QoS rule parameter, and the second QoS flow that matches the first QoS parameter in the first session is the first QoS flow, after the first terminal device determines the first QoS flow, the first terminal device first determines whether the first QoS flow includes a QoS rule corresponding to the QoS rule parameter. If the first QoS flow does not include the QoS rule corresponding to the QoS rule parameter, the first terminal device first obtains the session identifier of the first session and a QoS flow identifier of the first QoS flow, and then sends a second session modification request message to the network device. The second session modification request message includes the session identifier of the first session, the QoS flow identifier of the first QoS flow, and the QoS rule parameter. The first terminal device requests the network device to modify the first session, and then receives a second session modification response message sent by the network device. The second session modification response message includes the session identifier of the first session, the QoS flow identifier of the first QoS flow, and the QoS rule parameter. Finally, the first terminal device adds the QoS rule corresponding to the QoS rule parameter to the first QoS flow based on the second session modification response message. The QoS rule is a QoS rule corresponding to the second terminal device.

Optionally, the first terminal device may further send the session identifier of the first session and the QoS flow identifier of the first QoS flow to the second terminal device, and receive second data from the second terminal device. The second data includes the session identifier of the first session and the QoS flow identifier of the first QoS flow. After receiving the second data, the first terminal device sends the second data to the network device using the first QoS flow.

Optionally, the first terminal device may further establish a communications link with the second terminal device, and establish a correspondence between the communications link and the first QoS flow. Then, after receiving third data sent by the second terminal device through the communications link, the first terminal device may send the third data to the network device based on the correspondence using the first QoS flow.

In the data transmission method provided in this implementation, the first terminal device performs signaling interaction with the second terminal device using a data packet. After receiving the first data packet from the second terminal device, the first terminal device may determine, based on the first data packet, the first session parameter that meets a service requirement of the second terminal device, then determine, based on the first session parameter, the first session that meets the service requirement of the second terminal device, and finally forward the data of the second terminal device to the network device using the first session that meets the service requirement of the second terminal device. This improves data transmission efficiency.

The foregoing mainly describes the solutions provided in the embodiments of this application from the perspective of interaction between network elements. It may be understood that, to implement the foregoing functions, each network element such as the first terminal device, the second terminal device, or the network device includes a corresponding hardware structure or software module for performing each function, or a combination of the two. Persons skilled in the art should easily be aware that units and algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

In the embodiments of this application, the first terminal device, the second terminal device, or the network device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, module division is merely an example, and is merely logical function division. During actual implementation, another division manner may be used. An example in which each function module is obtained through division based on each corresponding function is used below for description.

Figure 8:
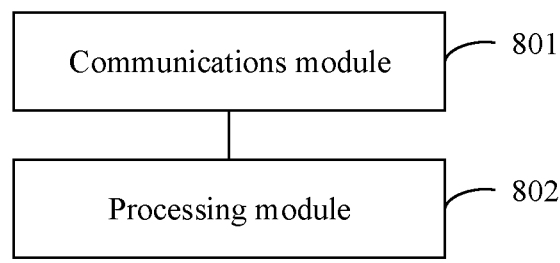
FIG. 8 is a block diagram of a structure of an implementation of a session parameter determining apparatus according to this application.

FIG. 8 is a block diagram of a structure of an implementation of a session parameter determining apparatus according to this application. The apparatus is applied to a first terminal device, and includes a communications module 801 and a processing module 802.

Optionally, the session parameter determining apparatus may perform at least one of the following solutions:

Solution 1: The communications module 801 is configured to receive a first message from a second terminal device, and the processing module 802 is configured to determine a first session parameter based on the first message.

Optionally, the communications module 801 may be further configured to receive a second message from the second terminal device, and the processing module 802 may be further configured to determine a first QoS parameter based on the second message.

Solution 2: The communications module 801 is configured to receive a first data packet from a second terminal device, and the processing module 802 is configured to determine a first session parameter based on the first data packet.

Optionally, the communications module 801 may be further configured to receive a second data packet from the second terminal device, and the processing module 802 may be further configured to determine a first QoS parameter based on the second data packet.

Figure 9:
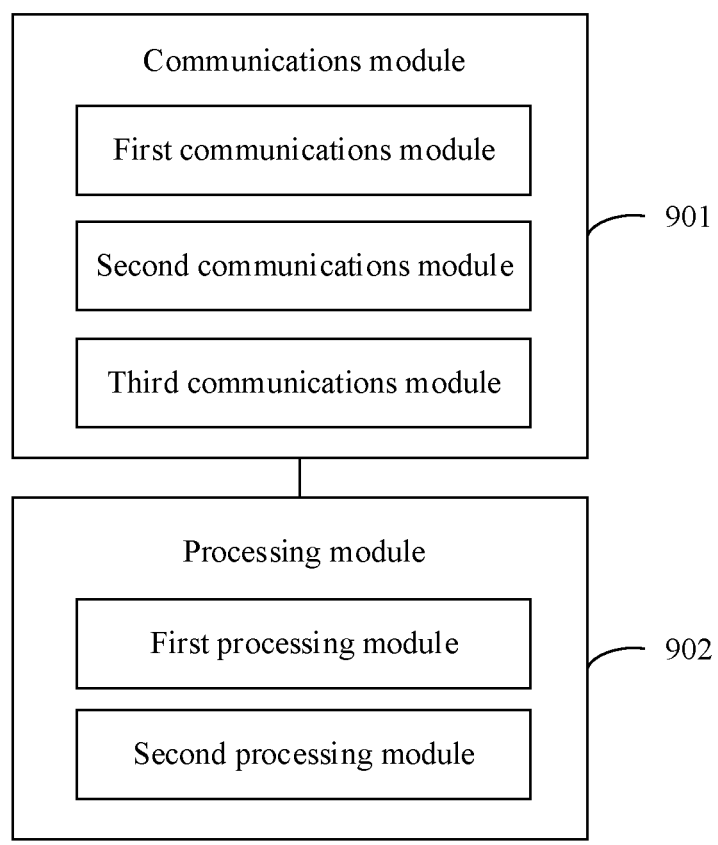
FIG. 9 is a block diagram of a structure of an implementation of a data transmission apparatus according to this application.

FIG. 9 is a block diagram of a structure of an implementation of a data transmission apparatus according to this application. The apparatus is applied to a first terminal device, and includes a communications module 901 and a processing module 902. The communications module 901 may include a first communications module, a second communications module, and a third communications module. The processing module 902 may include a first processing module and a second processing module.

Optionally, the data transmission apparatus may perform at least one of the following solutions:

Solution 1: The first communications module is configured to receive a first message from a second terminal device, the first processing module is configured to determine a first session parameter based on the first message, the second processing module is configured to determine a first session based on the first session parameter, the second communications module is configured to receive first data from the second terminal device, and the third communications module is configured to send the first data to a network device using the first session.

Optionally, the first communications module may be further configured to receive a second message from the second terminal device, the first processing module may be further configured to determine a first QoS parameter based on the second message, the second processing module may be further configured to determine a first QoS flow in the first session based on the first QoS parameter, and the third communications module may be further configured to send the first data to the network device using the first QoS flow.

Solution 2: The first communications module is configured to receive a first data packet from a second terminal device, the first processing module is configured to determine a first session parameter based on the first data packet, the second processing module is configured to determine a first session based on the first session parameter, the second communications module is configured to receive first data from the second terminal device, and the third communications module is configured to send the first data to a network device using the first session.

Optionally, the first communications module may be further configured to receive a second data packet from the second terminal device, the first processing module may be further configured to determine a first QoS parameter based on the second data packet, the second processing module may be further configured to determine a first QoS flow in the first session based on the first QoS parameter, and the third communications module may be further configured to send the first data to the network device using the first QoS flow.

During implementation, an embodiment of this application further provides a computer storage medium. The computer storage medium may store a program, the program includes instructions, and when the program is executed, some or all of the steps of the method shown in FIG. 4, FIG. 5, FIG. 6, or FIG. 7 provided in this application may be performed. The computer storage medium may be a magnetic disk, an optical disc, a read-only memory (ROM), a random-access memory (RAM), or the like.

All or some of the foregoing embodiments may be implemented using software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, the procedures or the functions according to this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (SSD), or the like.

An embodiment of this application further provides a communications system. The communications system includes a network device and a terminal device. The terminal device is configured to perform the technical solution shown in FIG. 4, FIG. 5, FIG. 6, or FIG. 7.

Figure 10:
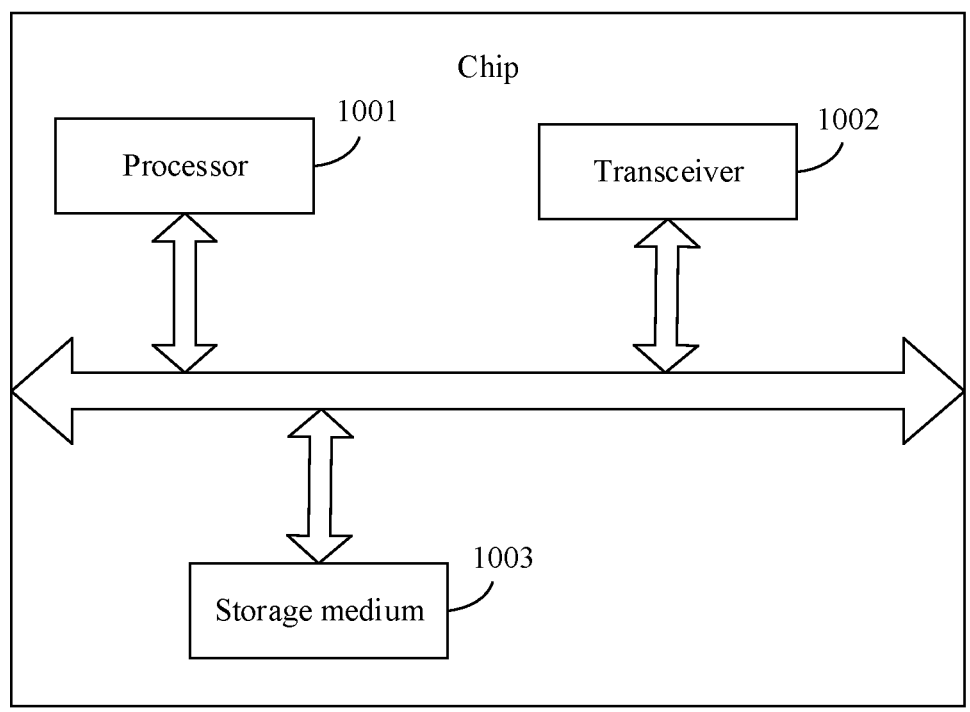
FIG. 10 is a block diagram of a structure of an implementation of a chip according to this application.

FIG. 10 is a block diagram of a structure of an implementation of a chip according to this application. The chip shown in FIG. 10 may be a general-purpose processor, or may be a special-purpose processor. The chip includes a processor 1001. The processor 1001 is configured to support the apparatus shown in FIG. 8 in performing the technical solution shown in FIG. 4 or FIG. 5 and support the apparatus shown in FIG. 9 in performing the technical solution shown in FIG. 6 or FIG. 7.

Optionally, the chip further includes a transceiver 1002. The transceiver 1002 is configured to receive control from the processor 1001 to support the apparatus shown in FIG. 8 in performing the technical solution shown in FIG. 4 or FIG. 5 and support the apparatus shown in FIG. 9 in performing the technical solution shown in FIG. 6 or FIG. 7.

Optionally, the chip shown in FIG. 10 may further include a storage medium 1003.

It should be noted that the chip shown in FIG. 10 may be implemented using the following circuit or component: one or more field programmable gate arrays (FPGA), a programmable logic device (PLD), a controller, a state machine, gate logic, a discrete hardware component, any other appropriate circuit, or any combination of circuits that can perform various functions described in this application.

The session parameter determining apparatus, the data transmission apparatus, the communications system, the computer storage medium, the computer program product, and the chip provided in the embodiments of this application are all configured to perform the methods provided above. Therefore, for beneficial effects that can be achieved by the session parameter determining apparatus, the data transmission apparatus, the communications system, the computer storage medium, the computer program product, and the chip, refer to beneficial effects corresponding to the methods provided above. Details are not described herein again.

With reference to the foregoing descriptions, this application further provides the following embodiments:

Embodiment 1: A session parameter determining method is provided. The method is applied to a first terminal device, and includes receiving a first message from a second terminal device, and determining a first session parameter based on the first message.

Embodiment 2: According to the session parameter determining method in Embodiment 1, the first message includes a second session parameter, and the second session parameter is a session parameter of a session that is determined by the second terminal device and that meets a service requirement of the second terminal device.

The determining a first session parameter based on the first message includes determining the first session parameter based on the second session parameter.

Embodiment 3: According to the session parameter determining method in Embodiment 1, the first message includes session parameter determining information.

The determining a first session parameter based on the first message includes determining the first session parameter based on the session parameter determining information.

Embodiment 4: According to the session parameter determining method in Embodiment 1, the determining a first session parameter based on the first message includes negotiating with the second terminal device to determine the first session parameter based on the first message.

Embodiment 5: According to the session parameter determining method in any one of Embodiment 1 to Embodiment 4, the method further includes determining a first bearer parameter based on the first message.

Embodiment 6: According to the session parameter determining method in Embodiment 5, the first message includes a second bearer parameter, and the second bearer parameter is a bearer parameter of a bearer that is determined by the second terminal device and that meets the service requirement of the second terminal device.

The determining a first bearer parameter based on the first message includes determining the first bearer parameter based on the second bearer parameter.

Embodiment 7: According to the session parameter determining method in Embodiment 5, the first message includes bearer parameter determining information.

The determining a first bearer parameter based on the first message includes determining the first bearer parameter based on the bearer parameter determining information.

Embodiment 8: According to the session parameter determining method in Embodiment 5, the determining a first bearer parameter based on the first message includes negotiating with the second terminal device to determine the first bearer parameter based on the first message.

Embodiment 9: According to the session parameter determining method in any one of Embodiment 1 to Embodiment 4, the method further includes receiving a second message from the second terminal device, where the second message is different from the first message, and determining a first bearer parameter based on the second message.

Embodiment 10: According to the session parameter determining method in Embodiment 9, the second message includes a second bearer parameter, and the second bearer parameter is a bearer parameter of a bearer that is determined by the second terminal device and that meets the service requirement of the second terminal device.

The determining a first bearer parameter based on the second message includes determining the first bearer parameter based on the second bearer parameter.

Embodiment 11: According to the session parameter determining method in Embodiment 9, the second message includes bearer parameter determining information.

The determining a first bearer parameter based on the second message includes determining the first bearer parameter based on the bearer parameter determining information.

Embodiment 12: According to the session parameter determining method in Embodiment 9, the determining a first bearer parameter based on the second message includes negotiating with the second terminal device to determine the first bearer parameter based on the second message.

Embodiment 13: According to the session parameter determining method in Embodiment 3, the session parameter determining information includes information about an application identifier.

Embodiment 14: According to the session parameter determining method in Embodiment 7 or Embodiment 11, the bearer parameter determining information includes one or more of the following information: application information, where the application information includes an application type or an application identifier used when a terminal device transmits data, device performance information, where the device performance information is used to indicate performance of the terminal device for transmitting data, network access technology information, where the network access technology information is used to indicate a network accessed by the terminal device, and common performance information, where the common performance information is used to indicate common performance supported by the terminal device, and the common performance information includes one or more of the following information: compression coding scheme information and rendering capability information.

Embodiment 15: According to the session parameter determining method in any one of Embodiment 1 to Embodiment 14, the first session parameter includes one or more of the following parameters: a network slice parameter, a data network name parameter, a session type parameter, a session and service continuity mode parameter, and a handover indication parameter, where the handover indication parameter is used to indicate whether the terminal device supports switching between the following two communications modes: communication with the network device and communication with the terminal device.

Embodiment 16: A session parameter determining method is provided. The method is applied to a first terminal device, and includes receiving a first data packet from a second terminal device, and determining a first session parameter based on the first data packet.

Embodiment 17: According to the session parameter determining method in Embodiment 16, the first data packet includes a second session parameter, and the second session parameter is a session parameter of a session that is determined by the second terminal device and that meets a service requirement of the second terminal device.

The determining a first session parameter based on the first data packet includes determining the first session parameter based on the second session parameter.

Embodiment 18: According to the session parameter determining method in Embodiment 16, the first data packet includes session parameter determining information.

The determining a first session parameter based on the first data packet includes determining the first session parameter based on the session parameter determining information.

Embodiment 19: According to the session parameter determining method in Embodiment 16, the determining a first session parameter based on the first data packet includes negotiating with the second terminal device to determine the first session parameter based on the first data packet.

Embodiment 20: According to the session parameter determining method in any one of Embodiment 16 to Embodiment 19, the method further includes determining a first bearer parameter based on the first data packet.

Embodiment 21: According to the session parameter determining method in Embodiment 20, the first data packet includes a second bearer parameter, and the second bearer parameter is a bearer parameter of a bearer that is determined by the second terminal device and that meets the service requirement of the second terminal device.

The determining a first bearer parameter based on the first data packet includes determining the first bearer parameter based on the second bearer parameter.

Embodiment 22: According to the session parameter determining method in Embodiment 20, the first data packet includes bearer parameter determining information.

The determining a first bearer parameter based on the first data packet includes determining the first bearer parameter based on the bearer parameter determining information.

Embodiment 23: According to the session parameter determining method in Embodiment 20, the determining a first bearer parameter based on the first data packet includes negotiating with the second terminal device to determine the first bearer parameter based on the first data packet.

Embodiment 24: According to the session parameter determining method in any one of Embodiment 16 to Embodiment 19, the method further includes receiving a second data packet from the second terminal device, where the second data packet is different from the first data packet, and determining a first bearer parameter based on the second data packet.

Embodiment 25: According to the session parameter determining method in Embodiment 24, the second data packet includes a second bearer parameter, and the second bearer parameter is a bearer parameter of a bearer that is determined by the second terminal device and that meets the service requirement of the second terminal device.

The determining a first bearer parameter based on the second data packet includes determining the first bearer parameter based on the second bearer parameter.

Embodiment 26: According to the session parameter determining method in Embodiment 24, the second data packet includes bearer parameter determining information.

The determining a first bearer parameter based on the second data packet includes determining the first bearer parameter based on the bearer parameter determining information.

Embodiment 27: According to the session parameter determining method in Embodiment 24, the determining a first bearer parameter based on the second data packet includes negotiating with the second terminal device to determine the first bearer parameter based on the second data packet.

Embodiment 28: According to the session parameter determining method in Embodiment 18, the session parameter determining information includes information about an application identifier.

Embodiment 29: According to the session parameter determining method in Embodiment 22 or Embodiment 26, the bearer parameter determining information includes one or more of the following information application information, where the application information includes an application type or an application identifier used when a terminal device transmits data, device performance information, where the device performance information is used to indicate performance of the terminal device for transmitting data, network access technology information, where the network access technology information is used to indicate a network accessed by the terminal device, and common performance information, where the common performance information is used to indicate common performance supported by the terminal device, and the common performance information includes one or more of the following information: compression coding scheme information and rendering capability information.

Embodiment 30: According to the session parameter determining method in any one of Embodiment 16 to Embodiment 29, the first session parameter includes one or more of the following parameters: a network slice parameter, a data network name parameter, a session type parameter, a session and service continuity mode parameter, and a handover indication parameter, where the handover indication parameter is used to indicate whether the terminal device supports switching between the following two communications modes: communication with the network device and communication with the terminal device.

Embodiment 31: A data transmission method is provided. The method is applied to a first terminal device, and includes receiving a first message from a second terminal device, determining a first session parameter based on the first message, determining a first session based on the first session parameter, receiving first data from the second terminal device, and sending the first data to a network device using the first session.

Embodiment 32: According to the data transmission method in Embodiment 31, the determining a first session based on the first session parameter includes: if there is a second session that matches the first session parameter, determining the first session as the second session, where the second session is a session that has been established between the first terminal device and the network device.

Embodiment 33: According to the data transmission method in Embodiment 31, the determining a first session based on the first session parameter includes sending a session establishment request message to the network device, where the session establishment request message includes the first session parameter, receiving a session establishment response message sent by the network device, and establishing the first session based on the session establishment response message.

Embodiment 34: According to the data transmission method in Embodiment 31, the determining a first session based on the first session parameter includes: if there is no second session that matches the first session parameter, sending a session establishment request message to the network device, where the session establishment request message includes the first session parameter, receiving a session establishment response message sent by the network device, and establishing the first session based on the session establishment response message.

Embodiment 35: According to the data transmission method in Embodiment 33 or Embodiment 34, the first session parameter includes a network slice parameter.

The establishing the first session based on the session establishment response message includes establishing, based on the session establishment response message, the first session in a network slice corresponding to the network slice parameter.

Embodiment 36: According to the data transmission method in any one of Embodiment 31 to Embodiment 35, the method further includes obtaining a session identifier of the first session, and sending the session identifier of the first session to the second terminal device.

Embodiment 37: A data transmission method is provided. The method is applied to a first terminal device, and includes: receiving a first message from a second terminal device, determining a first session parameter and a first bearer parameter based on the first message, determining a first session and a first bearer in the first session based on the first session parameter and the first bearer parameter, receiving first data from the second terminal device, and sending the first data to a network device using the first bearer.

Embodiment 38: According to the data transmission method in Embodiment 37, the determining a first session and a first bearer in the first session based on the first session parameter and the first bearer parameter includes sending a session establishment request message to the network device, where the session establishment request message includes the first session parameter and the first bearer parameter, receiving a session establishment response message sent by the network device, and establishing the first session based on the session establishment response message, and establishing the first bearer in the first session.

Embodiment 39: According to the data transmission method in Embodiment 37, the determining a first session and a first bearer in the first session based on the first session parameter and the first bearer parameter includes: if there is no second session that matches the first session parameter, sending a session establishment request message to the network device, where the session establishment request message includes the first session parameter and the first bearer parameter, and the second session is a session that has been established between the first terminal device and the network device, receiving a session establishment response message sent by the network device, and establishing the first session based on the session establishment response message, and establishing the first bearer in the first session.

Embodiment 40: According to the data transmission method in Embodiment 38 or Embodiment 39, the first session parameter includes a network slice parameter.

The establishing the first session based on the session establishment response message, and establishing the first bearer in the first session includes establishing, based on the session establishment response message, the first session in a network slice corresponding to the network slice parameter, and establishing the first bearer in the first session.

Embodiment 41: According to the data transmission method in any one of Embodiment 38 to Embodiment 40, the first bearer parameter includes a QoS rule parameter.

The method further includes adding a QoS rule corresponding to the QoS rule parameter to the first bearer based on the session establishment response message.

Embodiment 42: According to the data transmission method in Embodiment 37, the determining a first session and a first bearer in the first session based on the first session parameter and the first bearer parameter includes: if there is a second session that matches the first session parameter, determining the first session as the second session, where the second session is a session that has been established between the first terminal device and the network device, obtaining a session identifier of the second session, sending a first session modification request message to the network device, where the first session modification request message includes the session identifier of the second session and the first bearer parameter, receiving a first session modification response message sent by the network device, and establishing the first bearer in the second session based on the first session modification response message.

Embodiment 43: According to the data transmission method in Embodiment 37, the determining a first session and a first bearer in the first session based on the first session parameter and the first bearer parameter includes: if there is a second session that matches the first session parameter, determining the first session as the second session, where the second session is a session that has been established between the first terminal device and the network device, if the second session does not include a second bearer that matches the first bearer parameter, obtaining a session identifier of the second session, where the second bearer is a bearer that has been established in the second session, sending a first session modification request message to the network device, where the first session modification request message includes the session identifier of the second session and the first bearer parameter, receiving a first session modification response message sent by the network device, and establishing the first bearer in the second session based on the first session modification response message.

Embodiment 44: According to the data transmission method in Embodiment 42 or Embodiment 43, the first bearer parameter includes a QoS rule parameter.

The method further includes adding a QoS rule corresponding to the QoS rule parameter to the first bearer based on the first session modification response message.

Embodiment 45: According to the data transmission method in Embodiment 37, the determining a first session and a first bearer in the first session based on the first session parameter and the first bearer parameter includes: if there is a second session that matches the first session parameter, determining the first session as the second session, where the second session is a session that has been established between the first terminal device and the network device, and if the second session includes a second bearer that matches the first bearer parameter, determining the first bearer as the second bearer, where the second bearer is a bearer that has been established in the second session.

Embodiment 46: According to the data transmission method in Embodiment 45, the first bearer parameter includes a QoS rule parameter.

The method further includes obtaining a session identifier of the first session and a bearer identifier of the first bearer, sending a second session modification request message to the network device, where the second session modification request message includes the session identifier of the first session, the bearer identifier of the first bearer, and the QoS rule parameter, receiving a second session modification response message sent by the network device, and adding a QoS rule corresponding to the QoS rule parameter to the first bearer based on the second session modification response message.

Embodiment 47: According to the data transmission method in Embodiment 45, the first bearer parameter includes a QoS rule parameter.

The method further includes: if the first bearer does not include a QoS rule corresponding to the QoS rule parameter, obtaining a session identifier of the first session and a bearer identifier of the first bearer, sending a second session modification request message to the network device, where the second session modification request message includes the session identifier of the first session, the bearer identifier of the first bearer, and the QoS rule parameter, receiving a second session modification response message sent by the network device, and adding the QoS rule corresponding to the QoS rule parameter to the first bearer based on the second session modification response message.

Embodiment 48: According to the data transmission method in any one of Embodiment 37 to Embodiment 47, the method further includes obtaining the session identifier of the first session and the bearer identifier of the first bearer, and sending the session identifier of the first session and the bearer identifier of the first bearer to the second terminal device.

Embodiment 49: According to the data transmission method in Embodiment 48, the method further includes receiving second data from the second terminal device, where the second data includes the session identifier of the first session and the bearer identifier of the first bearer, and sending the second data to the network device using the first bearer.

Embodiment 50: According to the data transmission method in any one of Embodiment 37 to Embodiment 49, the method further includes establishing a communications link with the second terminal device, and establishing a correspondence between the communications link and the first bearer.

Embodiment 51: According to the data transmission method in Embodiment 50, the method further includes receiving third data sent by the second terminal device through the communications link, and sending the third data to the network device based on the correspondence using the first bearer.

Embodiment 52: A data transmission method is provided. The method is applied to a first terminal device, and includes receiving a first message from a second terminal device, determining a first session parameter based on the first message, determining a first session based on the first session parameter, obtaining a session identifier of the first session, sending the session identifier of the first session to the second terminal device, receiving a second message from the second terminal device, where the second message includes the session identifier of the first session; determining a first bearer parameter based on the second message, determining a first bearer in the first session based on the first bearer parameter, receiving first data from the second terminal device, and sending the first data to a network device using the first bearer.

Embodiment 53: According to the data transmission method in Embodiment 52, the determining a first session based on the first session parameter includes sending a session establishment request message to the network device, where the session establishment request message includes the first session parameter, receiving a session establishment response message sent by the network device, and establishing the first session based on the session establishment response message.

Embodiment 54: According to the data transmission method in Embodiment 52, the determining a first session based on the first session parameter includes: if there is no second session that matches the first session parameter, sending a session establishment request message to the network device, where the session establishment request message includes the first session parameter, receiving a session establishment response message sent by the network device, and establishing the first session based on the session establishment response message.

Embodiment 55: According to the data transmission method in Embodiment 53 or Embodiment 54, the first session parameter includes a network slice parameter.

The establishing the first session based on the session establishment response message includes establishing, based on the session establishment response message, the first session in a network slice corresponding to the network slice parameter.

Embodiment 56: According to the data transmission method in Embodiment 52, the determining a first session based on the first session parameter includes: if there is a second session that matches the first session parameter, determining the first session as the second session, where the second session is a session that has been established between the first terminal device and the network device.

Embodiment 57: According to the data transmission method in any one of Embodiment 52 to Embodiment 56, the determining a first bearer in the first session based on the first bearer parameter includes sending a first session modification request message to the network device, where the first session modification request message includes the session identifier of the first session and the first bearer parameter, receiving a first session modification response message sent by the network device, and establishing the first bearer in the first session based on the first session modification response message.

Embodiment 58: According to the data transmission method in any one of Embodiment 52 to Embodiment 56, the determining a first bearer in the first session based on the first bearer parameter includes: if the first session does not include a second bearer that matches the first bearer parameter, sending a first session modification request message to the network device, where the first session modification request message includes the session identifier of the first session and the first bearer parameter, receiving a first session modification response message sent by the network device, and establishing the first bearer in the first session based on the first session modification response message.

Embodiment 59: According to the data transmission method in Embodiment 57 or Embodiment 58, the first bearer parameter includes a QoS rule parameter.

The method further includes adding a QoS rule corresponding to the QoS rule parameter to the first bearer based on the first session modification response message.

Embodiment 60: According to the data transmission method in any one of Embodiment 52 to Embodiment 56, the determining a first bearer in the first session based on the first bearer parameter includes: if the first session includes a second bearer that matches the first bearer parameter, determining the first bearer as the second bearer.

Embodiment 61: According to the data transmission method in Embodiment 60, the first bearer parameter includes a QoS rule parameter.

The method further includes obtaining a bearer identifier of the first bearer, sending a second session modification request message to the network device, where the second session modification request message includes the session identifier of the first session, the bearer identifier of the first bearer, and the QoS rule parameter, receiving a second session modification response message sent by the network device, and adding a QoS rule corresponding to the QoS rule parameter to the first bearer based on the second session modification response message.

Embodiment 62: According to the data transmission method in Embodiment 60, the first bearer parameter includes a QoS rule parameter.

The method further includes: if the first bearer does not include a QoS rule corresponding to the QoS rule parameter, obtaining a bearer identifier of the first bearer, sending a second session modification request message to the network device, where the second session modification request message includes the session identifier of the first session, the bearer identifier of the first bearer, and the QoS rule parameter, receiving a second session modification response message sent by the network device, and adding the QoS rule corresponding to the QoS rule parameter to the first bearer based on the second session modification response message.

Embodiment 63: According to the data transmission method in Embodiment 52, the method further includes obtaining a bearer identifier of the first bearer, and sending the session identifier of the first session and the bearer identifier of the first bearer to the second terminal device.

Embodiment 64: According to the data transmission method in Embodiment 63, the method further includes receiving second data from the second terminal device, where the second data includes the session identifier of the first session and the bearer identifier of the first bearer, and sending the second data to the network device using the first bearer.

Embodiment 65: According to the data transmission method in any one of Embodiment 52 to Embodiment 64, the method further includes establishing a communications link with the second terminal device, and establishing a correspondence between the communications link and the first bearer.

Embodiment 66: According to the data transmission method in Embodiment 65, the method further includes receiving third data sent by the second terminal device through the communications link, and sending the third data to the network device based on the correspondence using the first bearer.

Embodiment 67: A data transmission method is provided. The method is applied to a first terminal device, and includes: receiving a first data packet from a second terminal device, determining a first session parameter based on the first data packet, determining a first session based on the first session parameter, receiving first data from the second terminal device, and sending the first data to a network device using the first session.

Embodiment 68: According to the data transmission method in Embodiment 67, the determining a first session based on the first session parameter includes: if there is a second session that matches the first session parameter, determining the first session as the second session, where the second session is a session that has been established between the first terminal device and the network device.

Embodiment 69: According to the data transmission method in Embodiment 67, the determining a first session based on the first session parameter includes sending a session establishment request message to the network device, where the session establishment request message includes the first session parameter, receiving a session establishment response message sent by the network device, and establishing the first session based on the session establishment response message.

Embodiment 70: According to the data transmission method in Embodiment 67, the determining a first session based on the first session parameter includes: if there is no second session that matches the first session parameter, sending a session establishment request message to the network device, where the session establishment request message includes the first session parameter, receiving a session establishment response message sent by the network device, and establishing the first session based on the session establishment response message.

Embodiment 71: According to the data transmission method in Embodiment 69 or Embodiment 70, the first session parameter includes a network slice parameter.

The establishing the first session based on the session establishment response message includes establishing, based on the session establishment response message, the first session in a network slice corresponding to the network slice parameter.

Embodiment 72: According to the data transmission method in any one of Embodiment 67 to Embodiment 71, the method further includes obtaining a session identifier of the first session, and sending the session identifier of the first session to the second terminal device.

Embodiment 73: A data transmission method is provided. The method is applied to a first terminal device, and includes receiving a first data packet from a second terminal device, determining a first session parameter and a first bearer parameter based on the first data packet, determining a first session and a first bearer in the first session based on the first session parameter and the first bearer parameter, receiving first data from the second terminal device, and sending the first data to a network device using the first bearer.

Embodiment 74: According to the data transmission method in Embodiment 73, the determining a first session and a first bearer in the first session based on the first session parameter and the first bearer parameter includes sending a session establishment request message to the network device, where the session establishment request message includes the first session parameter and the first bearer parameter, receiving a session establishment response message sent by the network device, and establishing the first session based on the session establishment response message, and establishing the first bearer in the first session.

Embodiment 75: According to the data transmission method in Embodiment 73, the determining a first session and a first bearer in the first session based on the first session parameter and the first bearer parameter includes: if there is no second session that matches the first session parameter, sending a session establishment request message to the network device, where the session establishment request message includes the first session parameter and the first bearer parameter, and the second session is a session that has been established between the first terminal device and the network device, receiving a session establishment response message sent by the network device, and establishing the first session based on the session establishment response message, and establishing the first bearer in the first session.

Embodiment 76: According to the data transmission method in Embodiment 74 or Embodiment 75, the first session parameter includes a network slice parameter.

The establishing the first session based on the session establishment response message, and establishing the first bearer in the first session includes establishing, based on the session establishment response message, the first session in a network slice corresponding to the network slice parameter, and establishing the first bearer in the first session.

Embodiment 77: According to the data transmission method in any one of Embodiment 74 to Embodiment 76, the first bearer parameter includes a QoS rule parameter.

The method further includes: adding a QoS rule corresponding to the QoS rule parameter to the first bearer based on the session establishment response message.

Embodiment 78: According to the data transmission method in Embodiment 73, the determining a first session and a first bearer in the first session based on the first session parameter and the first bearer parameter includes: if there is a second session that matches the first session parameter, determining the first session as the second session, where the second session is a session that has been established between the first terminal device and the network device, obtaining a session identifier of the second session, sending a first session modification request message to the network device, where the first session modification request message includes the session identifier of the second session and the first bearer parameter, receiving a first session modification response message sent by the network device, and establishing the first bearer in the second session based on the first session modification response message.

Embodiment 79: According to the data transmission method in Embodiment 73, the determining a first session and a first bearer in the first session based on the first session parameter and the first bearer parameter includes: if there is a second session that matches the first session parameter, determining the first session as the second session, where the second session is a session that has been established between the first terminal device and the network device, if the second session does not include a second bearer that matches the first bearer parameter, obtaining a session identifier of the second session, where the second bearer is a bearer that has been established in the second session, sending a first session modification request message to the network device, where the first session modification request message includes the session identifier of the second session and the first bearer parameter, receiving a first session modification response message sent by the network device, and establishing the first bearer in the second session based on the first session modification response message.

Embodiment 80: According to the data transmission method in Embodiment 78 or Embodiment 79, the first bearer parameter includes a QoS rule parameter.

The method further includes adding a QoS rule corresponding to the QoS rule parameter to the first bearer based on the first session modification response message.

Embodiment 81: According to the data transmission method in Embodiment 73, the determining a first session and a first bearer in the first session based on the first session parameter and the first bearer parameter includes: if there is a second session that matches the first session parameter, determining the first session as the second session, where the second session is a session that has been established between the first terminal device and the network device, and if the second session includes a second bearer that matches the first bearer parameter, determining the first bearer as the second bearer, where the second bearer is a bearer that has been established in the second session.

Embodiment 82: According to the data transmission method in Embodiment 81, the first bearer parameter includes a QoS rule parameter.

The method further includes obtaining a session identifier of the first session and a bearer identifier of the first bearer, sending a second session modification request message to the network device, where the second session modification request message includes the session identifier of the first session, the bearer identifier of the first bearer, and the QoS rule parameter, receiving a second session modification response message sent by the network device, and adding a QoS rule corresponding to the QoS rule parameter to the first bearer based on the second session modification response message.

Embodiment 83: According to the data transmission method in Embodiment 81, the first bearer parameter includes a QoS rule parameter.

The method further includes: if the first bearer does not include a QoS rule corresponding to the QoS rule parameter, obtaining a session identifier of the first session and a bearer identifier of the first bearer, sending a second session modification request message to the network device, where the second session modification request message includes the session identifier of the first session, the bearer identifier of the first bearer, and the QoS rule parameter, receiving a second session modification response message sent by the network device, and adding the QoS rule corresponding to the QoS rule parameter to the first bearer based on the second session modification response message.

Embodiment 84: According to the data transmission method in any one of Embodiment 73 to Embodiment 83, the method further includes obtaining the session identifier of the first session and the bearer identifier of the first bearer, and sending the session identifier of the first session and the bearer identifier of the first bearer to the second terminal device.

Embodiment 85: According to the data transmission method in Embodiment 84, the method further includes receiving second data from the second terminal device, where the second data includes the session identifier of the first session and the bearer identifier of the first bearer, and sending the second data to the network device using the first bearer.

Embodiment 86: According to the data transmission method in any one of Embodiment 73 to Embodiment 85, the method further includes establishing a communications link with the second terminal device, and establishing a correspondence between the communications link and the first bearer.

Embodiment 87: According to the data transmission method in Embodiment 86, the method further includes receiving third data sent by the second terminal device through the communications link, and sending the third data to the network device based on the correspondence using the first bearer.

Embodiment 88: A data transmission method is provided. The method is applied to a first terminal device, and includes: receiving a first data packet from a second terminal device, determining a first session parameter based on the first data packet, determining a first session based on the first session parameter, obtaining a session identifier of the first session, sending the session identifier of the first session to the second terminal device, receiving a second data packet from the second terminal device, where the second data packet includes the session identifier of the first session, determining a first bearer parameter based on the second data packet, determining a first bearer in the first session based on the first bearer parameter, receiving first data from the second terminal device; and sending the first data to a network device using the first bearer.

Embodiment 89: According to the data transmission method in Embodiment 88, the determining a first session based on the first session parameter includes sending a session establishment request message to the network device, where the session establishment request message includes the first session parameter, receiving a session establishment response message sent by the network device, and establishing the first session based on the session establishment response message.

Embodiment 90: According to the data transmission method in Embodiment 88, the determining a first session based on the first session parameter includes: if there is no second session that matches the first session parameter, sending a session establishment request message to the network device, where the session establishment request message includes the first session parameter, receiving a session establishment response message sent by the network device, and establishing the first session based on the session establishment response message.

Embodiment 91: According to the data transmission method in Embodiment 89 or Embodiment 90, the first session parameter includes a network slice parameter.

The establishing the first session based on the session establishment response message includes establishing, based on the session establishment response message, the first session in a network slice corresponding to the network slice parameter.

Embodiment 92: According to the data transmission method in Embodiment 88, the determining a first session based on the first session parameter includes: if there is a second session that matches the first session parameter, determining the first session as the second session, where the second session is a session that has been established between the first terminal device and the network device.

Embodiment 93: According to the data transmission method in any one of Embodiment 88 to Embodiment 92, the determining a first bearer in the first session based on the first bearer parameter includes sending a first session modification request message to the network device, where the first session modification request message includes the session identifier of the first session and the first bearer parameter, receiving a first session modification response message sent by the network device, and establishing the first bearer in the first session based on the first session modification response message.

Embodiment 94: According to the data transmission method in any one of Embodiment 88 to Embodiment 92, the determining a first bearer in the first session based on the first bearer parameter includes: if the first session does not include a second bearer that matches the first bearer parameter, sending a first session modification request message to the network device, where the first session modification request message includes the session identifier of the first session and the first bearer parameter, receiving a first session modification response message sent by the network device, and establishing the first bearer in the first session based on the first session modification response message.

Embodiment 95: According to the data transmission method in Embodiment 93 or Embodiment 94, the first bearer parameter includes a QoS rule parameter.

The method further includes adding a QoS rule corresponding to the QoS rule parameter to the first bearer based on the first session modification response message.

Embodiment 96: According to the data transmission method in any one of Embodiment 88 to Embodiment 92, the determining a first bearer in the first session based on the first bearer parameter includes: if the first session includes a second bearer that matches the first bearer parameter, determining the first bearer as the second bearer.

Embodiment 97: According to the data transmission method in Embodiment 96, the first bearer parameter includes a QoS rule parameter.

The method further includes obtaining a bearer identifier of the first bearer, sending a second session modification request message to the network device, where the second session modification request message includes the session identifier of the first session, the bearer identifier of the first bearer, and the QoS rule parameter, receiving a second session modification response message sent by the network device, and adding a QoS rule corresponding to the QoS rule parameter to the first bearer based on the second session modification response message.

Embodiment 98: According to the data transmission method in Embodiment 96, the first bearer parameter includes a QoS rule parameter.

The method further includes: if the first bearer does not include a QoS rule corresponding to the QoS rule parameter, obtaining a bearer identifier of the first bearer, sending a second session modification request message to the network device, where the second session modification request message includes the session identifier of the first session, the bearer identifier of the first bearer, and the QoS rule parameter, receiving a second session modification response message sent by the network device, and adding the QoS rule corresponding to the QoS rule parameter to the first bearer based on the second session modification response message.

Embodiment 99: According to the data transmission method in Embodiment 88, the method further includes obtaining a bearer identifier of the first bearer, and sending the session identifier of the first session and the bearer identifier of the first bearer to the second terminal device.

Embodiment 100: According to the data transmission method in Embodiment 99, the method further includes receiving second data from the second terminal device, where the second data includes the session identifier of the first session and the bearer identifier of the first bearer, and sending the second data to the network device using the first bearer.

Embodiment 101: According to the data transmission method in any one of Embodiment 88 to Embodiment 100, the method further includes establishing a communications link with the second terminal device, and establishing a correspondence between the communications link and the first bearer.

Embodiment 102: According to the data transmission method in Embodiment 101, the method further includes receiving third data sent by the second terminal device through the communications link, and sending the third data to the network device based on the correspondence using the first bearer.

Embodiment 103: A session parameter determining apparatus is provided. The apparatus is applied to a first terminal device, and includes a communications module and a processing module.

The communications module is configured to receive a first message from a second terminal device.

The processing module is configured to determine a first session parameter based on the first message.

Embodiment 104: According to the session parameter determining apparatus in Embodiment 103, the first message includes a second session parameter, and the second session parameter is a session parameter of a session that is determined by the second terminal device and that meets a service requirement of the second terminal device.

The processing module is configured to determine the first session parameter based on the second session parameter.

Embodiment 105: According to the session parameter determining apparatus in Embodiment 103, the first message includes session parameter determining information.

The processing module is configured to: determine the first session parameter based on the session parameter determining information.

Embodiment 106: According to the session parameter determining apparatus in Embodiment 103, the processing module is configured to negotiate with the second terminal device to determine the first session parameter based on the first message.

Embodiment 107: According to the session parameter determining apparatus in any one of Embodiment 103 to Embodiment 106, the processing module is further configured to determine a first bearer parameter based on the first message.

Embodiment 108: According to the session parameter determining apparatus in Embodiment 107, the first message includes a second bearer parameter, and the second bearer parameter is a bearer parameter of a bearer that is determined by the second terminal device and that meets the service requirement of the second terminal device.

The processing module is configured to determine the first bearer parameter based on the second bearer parameter.

Embodiment 109: According to the session parameter determining apparatus in Embodiment 107, the first message includes bearer parameter determining information.

The processing module is configured to determine the first bearer parameter based on the bearer parameter determining information.

Embodiment 110: According to the session parameter determining apparatus in Embodiment 107, the processing module is configured to negotiate with the second terminal device to determine the first bearer parameter based on the first message.

Embodiment 111: According to the session parameter determining apparatus in any one of Embodiment 103 to Embodiment 106, the communications module is further configured to receive a second message from the second terminal device, where the second message is different from the first message, and the processing module is further configured to determine a first bearer parameter based on the second message.

Embodiment 112: According to the session parameter determining apparatus in Embodiment 111, the second message includes a second bearer parameter, and the second bearer parameter is a bearer parameter of a bearer that is determined by the second terminal device and that meets the service requirement of the second terminal device.

The processing module is configured to determine the first bearer parameter based on the second bearer parameter.

Embodiment 113: According to the session parameter determining apparatus in Embodiment 111, the second message includes bearer parameter determining information.

The processing module is configured to determine the first bearer parameter based on the bearer parameter determining information.

Embodiment 114: According to the session parameter determining apparatus in Embodiment 111, the processing module is configured to negotiate with the second terminal device to determine the first bearer parameter based on the second message.

Embodiment 115: According to the session parameter determining apparatus in Embodiment 105, the session parameter determining information includes information about an application identifier.

Embodiment 116: According to the session parameter determining apparatus in Embodiment 109 or Embodiment 113, the bearer parameter determining information includes one or more of the following information: application information, where the application information includes an application type or an application identifier used when a terminal device transmits data, device performance information, where the device performance information is used to indicate performance of the terminal device for transmitting data, network access technology information, where the network access technology information is used to indicate a network accessed by the terminal device, and common performance information, where the common performance information is used to indicate common performance supported by the terminal device, and the common performance information includes one or more of the following information: compression coding scheme information and rendering capability information.

Embodiment 117: According to the session parameter determining apparatus in any one of Embodiment 103 to Embodiment 116, the first session parameter includes one or more of the following parameters: a network slice parameter, a data network name parameter, a session type parameter, a session and service continuity mode parameter, and a handover indication parameter, where the handover indication parameter is used to indicate whether the terminal device supports switching between the following two communications modes: communication with the network device and communication with the terminal device.

Embodiment 118: A session parameter determining apparatus is provided. The apparatus is applied to a first terminal device, and includes a communications module and a processing module.

The communications module is configured to receive a first data packet from a second terminal device.

The processing module is configured to determine a first session parameter based on the first data packet.

Embodiment 119: According to the session parameter determining apparatus in Embodiment 118, the first data packet includes a second session parameter, and the second session parameter is a session parameter of a session that is determined by the second terminal device and that meets a service requirement of the second terminal device.

The processing module is configured to determine the first session parameter based on the second session parameter.

Embodiment 120: According to the session parameter determining apparatus in Embodiment 118, the first data packet includes session parameter determining information.

The processing module is configured to determine the first session parameter based on the session parameter determining information.

Embodiment 121: According to the session parameter determining apparatus in Embodiment 118, the processing module is configured to negotiate with the second terminal device to determine the first session parameter based on the first data packet.

Embodiment 122: According to the session parameter determining apparatus in any one of Embodiment 118 to Embodiment 121, the processing module is further configured to determine a first bearer parameter based on the first data packet.

Embodiment 123: According to the session parameter determining apparatus in Embodiment 122, the first data packet includes a second bearer parameter, and the second bearer parameter is a bearer parameter of a bearer that is determined by the second terminal device and that meets the service requirement of the second terminal device.

The processing module is configured to determine the first bearer parameter based on the second bearer parameter.

Embodiment 124: According to the session parameter determining apparatus in Embodiment 122, the first data packet includes bearer parameter determining information.

The processing module is configured to determine the first bearer parameter based on the bearer parameter determining information.

Embodiment 125: According to the session parameter determining apparatus in Embodiment 122, the processing module is configured to negotiate with the second terminal device to determine the first bearer parameter based on the first data packet.

Embodiment 126: According to the session parameter determining apparatus in any one of Embodiment 118 to Embodiment 121, the communications module is further configured to receive a second data packet from the second terminal device, where the second data packet is different from the first data packet, and the processing module is further configured to determine a first bearer parameter based on the second data packet.

Embodiment 127: According to the session parameter determining apparatus in Embodiment 126, the second data packet includes a second bearer parameter, and the second bearer parameter is a bearer parameter of a bearer that is determined by the second terminal device and that meets the service requirement of the second terminal device.

The processing module is configured to determine the first bearer parameter based on the second bearer parameter.

Embodiment 128: According to the session parameter determining apparatus in Embodiment 126, the second data packet includes bearer parameter determining information.

The processing module is configured to determine the first bearer parameter based on the bearer parameter determining information.

Embodiment 129: According to the session parameter determining apparatus in Embodiment 126, the processing module is configured to negotiate with the second terminal device to determine the first bearer parameter based on the second data packet.

Embodiment 130: According to the session parameter determining apparatus in Embodiment 120, the session parameter determining information includes information about an application identifier.

Embodiment 131: According to the session parameter determining apparatus in Embodiment 124 or Embodiment 128, the bearer parameter determining information includes one or more of the following information: application information, where the application information includes an application type or an application identifier used when a terminal device transmits data, device performance information, where the device performance information is used to indicate performance of the terminal device for transmitting data, network access technology information, where the network access technology information is used to indicate a network accessed by the terminal device, and common performance information, where the common performance information is used to indicate common performance supported by the terminal device, and the common performance information includes one or more of the following information: compression coding scheme information and rendering capability information.

Embodiment 132: According to the session parameter determining apparatus in any one of Embodiment 118 to Embodiment 131, the first session parameter includes one or more of the following parameters: a network slice parameter, a data network name parameter, a session type parameter, a session and service continuity mode parameter, and a handover indication parameter, where the handover indication parameter is used to indicate whether the terminal device supports switching between the following two communications modes: communication with the network device and communication with the terminal device.

Embodiment 133: A data transmission apparatus is provided. The apparatus is applied to a first terminal device, and includes a communications module and a processing module.

The communications module is configured to receive a first message from a second terminal device.

The processing module is configured to determine a first session parameter based on the first message, and determine a first session based on the first session parameter.

The communications module is configured to receive first data from the second terminal device, and send the first data to a network device using the first session.

Embodiment 134: According to the data transmission apparatus in Embodiment 133, the processing module is configured to: if there is a second session that matches the first session parameter, determine the first session as the second session, where the second session is a session that has been established between the first terminal device and the network device.

Embodiment 135: According to the data transmission apparatus in Embodiment 133, the communications module is configured to send a session establishment request message to the network device, where the session establishment request message includes the first session parameter, and receive a session establishment response message sent by the network device.

The processing module is configured to establish the first session based on the session establishment response message.

Embodiment 136: According to the data transmission apparatus in Embodiment 133, the communications module is configured to: if there is no second session that matches the first session parameter, send a session establishment request message to the network device, where the session establishment request message includes the first session parameter, and receive a session establishment response message sent by the network device.

The processing module is configured to establish the first session based on the session establishment response message.

Embodiment 137: According to the data transmission apparatus in Embodiment 135 or Embodiment 136, the first session parameter includes a network slice parameter.

The processing module is configured to establish, based on the session establishment response message, the first session in a network slice corresponding to the network slice parameter.

Embodiment 138: According to the data transmission apparatus in any one of Embodiment 133 to Embodiment 137, the processing module is further configured to obtain a session identifier of the first session, and the communications module is further configured to send the session identifier of the first session to the second terminal device.

Embodiment 139: A data transmission apparatus is provided. The apparatus is applied to a first terminal device, and includes a communications module and a processing module.

The communications module is configured to receive a first message from a second terminal device.

The processing module is configured to determine a first session parameter and a first bearer parameter based on the first message, and determine a first session and a first bearer in the first session based on the first session parameter and the first bearer parameter.

The communications module is configured to receive first data from the second terminal device, and send the first data to a network device using the first bearer.

Embodiment 140: According to the data transmission apparatus in Embodiment 139, the communications module is configured to send a session establishment request message to the network device, where the session establishment request message includes the first session parameter and the first bearer parameter, and receive a session establishment response message sent by the network device.

The processing module is configured to establish the first session based on the session establishment response message, and establish the first bearer in the first session.

Embodiment 141: According to the data transmission apparatus in Embodiment 139, the communications module is configured to: if there is no second session that matches the first session parameter, send a session establishment request message to the network device, where the session establishment request message includes the first session parameter and the first bearer parameter, and the second session is a session that has been established between the first terminal device and the network device, and receive a session establishment response message sent by the network device.

The processing module is configured to establish the first session based on the session establishment response message, and establish the first bearer in the first session.

Embodiment 142: According to the data transmission apparatus in Embodiment 140 or Embodiment 141, the first session parameter includes a network slice parameter.

The processing module is configured to establish, based on the session establishment response message, the first session in a network slice corresponding to the network slice parameter, and establish the first bearer in the first session.

Embodiment 143: According to the data transmission apparatus in any one of Embodiment 140 to Embodiment 142, the first bearer parameter includes a QoS rule parameter.

The processing module is further configured to add a QoS rule corresponding to the QoS rule parameter to the first bearer based on the session establishment response message.

Embodiment 144: According to the data transmission apparatus in Embodiment 139, the processing module is configured to: if there is a second session that matches the first session parameter, determine the first session as the second session, where the second session is a session that has been established between the first terminal device and the network device, and obtain a session identifier of the second session.

The communications module is configured to send a first session modification request message to the network device, where the first session modification request message includes the session identifier of the second session and the first bearer parameter, and receive a first session modification response message sent by the network device.

The processing module is configured to establish the first bearer in the second session based on the first session modification response message.

Embodiment 145: According to the data transmission apparatus in Embodiment 139, the processing module is configured to: if there is a second session that matches the first session parameter, determine the first session as the second session, where the second session is a session that has been established between the first terminal device and the network device, and if the second session does not include a second bearer that matches the first bearer parameter, obtain a session identifier of the second session, where the second bearer is a bearer that has been established in the second session.

The communications module is configured to send a first session modification request message to the network device, where the first session modification request message includes the session identifier of the second session and the first bearer parameter, and receive a first session modification response message sent by the network device.

The processing module is configured to establish the first bearer in the second session based on the first session modification response message.

Embodiment 146: According to the data transmission apparatus in Embodiment 144 or Embodiment 145, the first bearer parameter includes a QoS rule parameter.

The processing module is further configured to add a QoS rule corresponding to the QoS rule parameter to the first bearer based on the first session modification response message.

Embodiment 147: According to the data transmission apparatus in Embodiment 139, the processing module is configured to: if there is a second session that matches the first session parameter, determine the first session as the second session, where the second session is a session that has been established between the first terminal device and the network device, and if the second session includes a second bearer that matches the first bearer parameter, determine the first bearer as the second bearer, where the second bearer is a bearer that has been established in the second session.

Embodiment 148: According to the data transmission apparatus in Embodiment 147, the first bearer parameter includes a QoS rule parameter.

The processing module is further configured to obtain a session identifier of the first session and a bearer identifier of the first bearer.

The communications module is further configured to send a second session modification request message to the network device, where the second session modification request message includes the session identifier of the first session, the bearer identifier of the first bearer, and the QoS rule parameter, and receive a second session modification response message sent by the network device.

The processing module is further configured to add a QoS rule corresponding to the QoS rule parameter to the first bearer based on the second session modification response message.

Embodiment 149: According to the data transmission apparatus in Embodiment 147, the first bearer parameter includes a QoS rule parameter.

The processing module is further configured to: if the first bearer does not include a QoS rule corresponding to the QoS rule parameter, obtain a session identifier of the first session and a bearer identifier of the first bearer.

The communications module is further configured to send a second session modification request message to the network device, where the second session modification request message includes the session identifier of the first session, the bearer identifier of the first bearer, and the QoS rule parameter, and receive a second session modification response message sent by the network device.

The processing module is further configured to add the QoS rule corresponding to the QoS rule parameter to the first bearer based on the second session modification response message.

Embodiment 150: According to the data transmission apparatus in any one of Embodiment 139 to Embodiment 149, the processing module is further configured to obtain the session identifier of the first session and the bearer identifier of the first bearer.

The communications module is further configured to send the session identifier of the first session and the bearer identifier of the first bearer to the second terminal device.

Embodiment 151: According to the data transmission apparatus in Embodiment 150, the communications module is further configured to receive second data from the second terminal device, where the second data includes the session identifier of the first session and the bearer identifier of the first bearer, and send the second data to the network device using the first bearer.

Embodiment 152: According to the data transmission apparatus in any one of Embodiment 139 to Embodiment 151, the processing module is further configured to establish a communications link with the second terminal device, and establish a correspondence between the communications link and the first bearer.

Embodiment 153: According to the data transmission apparatus in Embodiment 152, the communications module is further configured to receive third data sent by the second terminal device through the communications link, and send the third data to the network device based on the correspondence using the first bearer.

Embodiment 154: A data transmission apparatus is provided. The apparatus is applied to a first terminal device, and includes a communications module and a processing module.

The communications module is configured to receive a first message from a second terminal device.

The processing module is configured to determine a first session parameter based on the first message, determine a first session based on the first session parameter, and obtain a session identifier of the first session.

The communications module is configured to send the session identifier of the first session to the second terminal device, and receive a second message from the second terminal device. The second message includes the session identifier of the first session.

The processing module is configured to determine a first bearer parameter based on the second message, and determine a first bearer in the first session based on the first bearer parameter.

The communications module is configured to receive first data from the second terminal device, and send the first data to a network device using the first bearer.

Embodiment 155: According to the data transmission apparatus in Embodiment 154, the communications module is configured to send a session establishment request message to the network device, where the session establishment request message includes the first session parameter, and receive a session establishment response message sent by the network device.

The processing module is configured to establish the first session based on the session establishment response message.

Embodiment 156: According to the data transmission apparatus in Embodiment 154, the communications module is configured to: if there is no second session that matches the first session parameter, send a session establishment request message to the network device, where the session establishment request message includes the first session parameter, and receive a session establishment response message sent by the network device.

The processing module is configured to establish the first session based on the session establishment response message.

Embodiment 157: According to the data transmission apparatus in Embodiment 155 or Embodiment 156, the first session parameter includes a network slice parameter.

The processing module is configured to establish, based on the session establishment response message, the first session in a network slice corresponding to the network slice parameter.

Embodiment 158: According to the data transmission apparatus in Embodiment 154, the processing module is configured to: if there is a second session that matches the first session parameter, determine the first session as the second session, where the second session is a session that has been established between the first terminal device and the network device.

Embodiment 159: According to the data transmission apparatus in any one of Embodiment 154 to Embodiment 158, the communications module is configured to send a first session modification request message to the network device, where the first session modification request message includes the session identifier of the first session and the first bearer parameter, and receive a first session modification response message sent by the network device.

The processing module is configured to establish the first bearer in the first session based on the first session modification response message.

Embodiment 160: According to the data transmission apparatus in any one of Embodiment 154 to Embodiment 158, the communications module is configured to: if the first session does not include a second bearer that matches the first bearer parameter, send a first session modification request message to the network device, where the first session modification request message includes the session identifier of the first session and the first bearer parameter, and receive a first session modification response message sent by the network device.

The processing module is configured to establish the first bearer in the first session based on the first session modification response message.

Embodiment 161: According to the data transmission apparatus in Embodiment 159 or Embodiment 160, the first bearer parameter includes a QoS rule parameter.

The processing module is further configured to add a QoS rule corresponding to the QoS rule parameter to the first bearer based on the first session modification response message.

Embodiment 162: According to the data transmission apparatus in any one of Embodiment 154 to Embodiment 158, the processing module is configured to: if the first session includes a second bearer that matches the first bearer parameter, determine the first bearer as the second bearer.

Embodiment 163: According to the data transmission apparatus in Embodiment 162, the first bearer parameter includes a QoS rule parameter.

The processing module is further configured to obtain a bearer identifier of the first bearer.

The communications module is further configured to send a second session modification request message to the network device, where the second session modification request message includes the session identifier of the first session, the bearer identifier of the first bearer, and the QoS rule parameter, and receive a second session modification response message sent by the network device.

The processing module is further configured to add a QoS rule corresponding to the QoS rule parameter to the first bearer based on the second session modification response message.

Embodiment 164: According to the data transmission apparatus in Embodiment 162, the first bearer parameter includes a QoS rule parameter.

The processing module is further configured to: if the first bearer does not include a QoS rule corresponding to the QoS rule parameter, obtain a bearer identifier of the first bearer.

The communications module is further configured to send a second session modification request message to the network device, where the second session modification request message includes the session identifier of the first session, the bearer identifier of the first bearer, and the QoS rule parameter, and receive a second session modification response message sent by the network device.

The processing module is further configured to add the QoS rule corresponding to the QoS rule parameter to the first bearer based on the second session modification response message.

Embodiment 165: According to the data transmission apparatus in Embodiment 154, the processing module is further configured to obtain a bearer identifier of the first bearer.

The communications module is further configured to send the session identifier of the first session and the bearer identifier of the first bearer to the second terminal device.

Embodiment 166: According to the data transmission apparatus in Embodiment 165, the communications module is further configured to receive second data from the second terminal device, where the second data includes the session identifier of the first session and the bearer identifier of the first bearer, and send the second data to the network device using the first bearer.

Embodiment 167: According to the data transmission apparatus in any one of Embodiment 154 to Embodiment 166, the processing module is further configured to establish a communications link with the second terminal device, and establish a correspondence between the communications link and the first bearer.

Embodiment 168: According to the data transmission apparatus in Embodiment 167, the communications module is further configured to receive third data sent by the second terminal device through the communications link, and send the third data to the network device based on the correspondence using the first bearer.

Embodiment 169: A data transmission apparatus is provided. The apparatus is applied to a first terminal device, and includes a communications module and a processing module.

The communications module is configured to receive a first data packet from a second terminal device.

The processing module is configured to determine a first session parameter based on the first data packet, and determine a first session based on the first session parameter.

The communications module is configured to receive first data from the second terminal device, and send the first data to a network device using the first session.

Embodiment 170: According to the data transmission apparatus in Embodiment 169, the processing module is configured to: if there is a second session that matches the first session parameter, determine the first session as the second session, where the second session is a session that has been established between the first terminal device and the network device.

Embodiment 171: According to the data transmission apparatus in Embodiment 169, the communications module is configured to send a session establishment request message to the network device, where the session establishment request message includes the first session parameter, and receive a session establishment response message sent by the network device.

The processing module is configured to establish the first session based on the session establishment response message.

Embodiment 172: According to the data transmission apparatus in Embodiment 169, the communications module is configured to: if there is no second session that matches the first session parameter, send a session establishment request message to the network device, where the session establishment request message includes the first session parameter, and receive a session establishment response message sent by the network device.

The processing module is configured to establish the first session based on the session establishment response message.

Embodiment 173: According to the data transmission apparatus in Embodiment 171 or Embodiment 172, the first session parameter includes a network slice parameter.

The processing module is configured to establish, based on the session establishment response message, the first session in a network slice corresponding to the network slice parameter.

Embodiment 174: According to the data transmission apparatus in any one of Embodiment 169 to Embodiment 173, the processing module is further configured to obtain a session identifier of the first session, and the communications module is further configured to send the session identifier of the first session to the second terminal device.

Embodiment 175: A data transmission apparatus is provided. The apparatus is applied to a first terminal device, and includes a communications module and a processing module.

The communications module is configured to receive a first data packet from a second terminal device.

The processing module is configured to determine a first session parameter and a first bearer parameter based on the first data packet, and determine a first session and a first bearer in the first session based on the first session parameter and the first bearer parameter.

The communications module is configured to receive first data from the second terminal device, and send the first data to a network device using the first bearer.

Embodiment 176: According to the data transmission apparatus in Embodiment 175, the communications module is configured to send a session establishment request message to the network device, where the session establishment request message includes the first session parameter and the first bearer parameter, and receive a session establishment response message sent by the network device.

The processing module is configured to establish the first session based on the session establishment response message, and establish the first bearer in the first session.

Embodiment 177: According to the data transmission apparatus in Embodiment 175, the communications module is configured to: if there is no second session that matches the first session parameter, send a session establishment request message to the network device, where the session establishment request message includes the first session parameter and the first bearer parameter, and the second session is a session that has been established between the first terminal device and the network device, and receive a session establishment response message sent by the network device.

The processing module is configured to establish the first session based on the session establishment response message, and establish the first bearer in the first session.

Embodiment 178: According to the data transmission apparatus in Embodiment 176 or Embodiment 177, the first session parameter includes a network slice parameter.

The processing module is configured to establish, based on the session establishment response message, the first session in a network slice corresponding to the network slice parameter, and establish the first bearer in the first session.

Embodiment 179: According to the data transmission apparatus in any one of Embodiment 176 to Embodiment 178, the first bearer parameter includes a QoS rule parameter.

The processing module is further configured to add a QoS rule corresponding to the QoS rule parameter to the first bearer based on the session establishment response message.

Embodiment 180: According to the data transmission apparatus in Embodiment 175, the processing module is configured to: if there is a second session that matches the first session parameter, determine the first session as the second session, where the second session is a session that has been established between the first terminal device and the network device, and obtain a session identifier of the second session.

The communications module is configured to send a first session modification request message to the network device, where the first session modification request message includes the session identifier of the second session and the first bearer parameter, and receive a first session modification response message sent by the network device.

The processing module is configured to establish the first bearer in the second session based on the first session modification response message.

Embodiment 181: According to the data transmission apparatus in Embodiment 175, the processing module is configured to: if there is a second session that matches the first session parameter, determine the first session as the second session, where the second session is a session that has been established between the first terminal device and the network device, and if the second session does not include a second bearer that matches the first bearer parameter, obtain a session identifier of the second session, where the second bearer is a bearer that has been established in the second session.

The communications module is configured to send a first session modification request message to the network device, where the first session modification request message includes the session identifier of the second session and the first bearer parameter, and receive a first session modification response message sent by the network device.

The processing module is configured to establish the first bearer in the second session based on the first session modification response message.

Embodiment 182: According to the data transmission apparatus in Embodiment 180 or Embodiment 181, the first bearer parameter includes a QoS rule parameter.

The processing module is further configured to add a QoS rule corresponding to the QoS rule parameter to the first bearer based on the first session modification response message.

Embodiment 183: According to the data transmission apparatus in Embodiment 175, the processing module is configured to: if there is a second session that matches the first session parameter, determine the first session as the second session, where the second session is a session that has been established between the first terminal device and the network device, and if the second session includes a second bearer that matches the first bearer parameter, determine the first bearer as the second bearer, where the second bearer is a bearer that has been established in the second session.

Embodiment 184: According to the data transmission apparatus in Embodiment 183, the first bearer parameter includes a QoS rule parameter.

The processing module is further configured to obtain a session identifier of the first session and a bearer identifier of the first bearer.

The communications module is further configured to send a second session modification request message to the network device, where the second session modification request message includes the session identifier of the first session, the bearer identifier of the first bearer, and the QoS rule parameter, and receive a second session modification response message sent by the network device.

The processing module is further configured to add a QoS rule corresponding to the QoS rule parameter to the first bearer based on the second session modification response message.

Embodiment 185: According to the data transmission apparatus in Embodiment 183, the first bearer parameter includes a QoS rule parameter.

The processing module is further configured to: if the first bearer does not include a QoS rule corresponding to the QoS rule parameter, obtain a session identifier of the first session and a bearer identifier of the first bearer.

The communications module is further configured to send a second session modification request message to the network device, where the second session modification request message includes the session identifier of the first session, the bearer identifier of the first bearer, and the QoS rule parameter, and receive a second session modification response message sent by the network device.

The processing module is further configured to add the QoS rule corresponding to the QoS rule parameter to the first bearer based on the second session modification response message.

Embodiment 186: According to the data transmission apparatus in any one of Embodiment 175 to Embodiment 185, the processing module is further configured to obtain the session identifier of the first session and the bearer identifier of the first bearer.

The communications module is further configured to send the session identifier of the first session and the bearer identifier of the first bearer to the second terminal device.

Embodiment 187: According to the data transmission apparatus in Embodiment 186, the communications module is further configured to receive second data from the second terminal device, where the second data includes the session identifier of the first session and the bearer identifier of the first bearer, and send the second data to the network device using the first bearer.

Embodiment 188: According to the data transmission apparatus in any one of Embodiment 175 to Embodiment 187, the processing module is further configured to establish a communications link with the second terminal device, and establish a correspondence between the communications link and the first bearer.

Embodiment 189: According to the data transmission apparatus in Embodiment 188, the communications module is further configured to receive third data sent by the second terminal device through the communications link, and send the third data to the network device based on the correspondence using the first bearer.

Embodiment 190: A data transmission apparatus is provided. The apparatus is applied to a first terminal device, and includes a communications module and a processing module.

The communications module is configured to receive a first data packet from a second terminal device.

The processing module is configured to determine a first session parameter based on the first data packet, determine a first session based on the first session parameter, and obtain a session identifier of the first session.

The communications module is configured to send the session identifier of the first session to the second terminal device, and receive a second data packet from the second terminal device. The second data packet includes the session identifier of the first session.

The processing module is configured to determine a first bearer parameter based on the second data packet, and determine a first bearer in the first session based on the first bearer parameter.

The communications module is configured to receive first data from the second terminal device, and send the first data to a network device using the first bearer.

Embodiment 191: According to the data transmission apparatus in Embodiment 190, the communications module is configured to send a session establishment request message to the network device, where the session establishment request message includes the first session parameter, and receive a session establishment response message sent by the network device.

The processing module is configured to establish the first session based on the session establishment response message.

Embodiment 192: According to the data transmission apparatus in Embodiment 190, the communications module is configured to: if there is no second session that matches the first session parameter, send a session establishment request message to the network device, where the session establishment request message includes the first session parameter, and receive a session establishment response message sent by the network device.

The processing module is configured to establish the first session based on the session establishment response message.

Embodiment 193: According to the data transmission apparatus in Embodiment 191 or Embodiment 192, the first session parameter includes a network slice parameter.

The processing module is configured to establish, based on the session establishment response message, the first session in a network slice corresponding to the network slice parameter.

Embodiment 194: According to the data transmission apparatus in Embodiment 190, the processing module is configured to: if there is a second session that matches the first session parameter, determine the first session as the second session, where the second session is a session that has been established between the first terminal device and the network device.

Embodiment 195: According to the data transmission apparatus in any one of Embodiment 190 to Embodiment 194, the communications module is configured to send a first session modification request message to the network device, where the first session modification request message includes the session identifier of the first session and the first bearer parameter, and receive a first session modification response message sent by the network device.

The processing module is configured to establish the first bearer in the first session based on the first session modification response message.

Embodiment 196: According to the data transmission apparatus in any one of Embodiment 190 to Embodiment 194, the communications module is configured to: if the first session does not include a second bearer that matches the first bearer parameter, send a first session modification request message to the network device, where the first session modification request message includes the session identifier of the first session and the first bearer parameter, and receive a first session modification response message sent by the network device.

The processing module is configured to establish the first bearer in the first session based on the first session modification response message.

Embodiment 197: According to the data transmission apparatus in Embodiment 195 or Embodiment 196, the first bearer parameter includes a QoS rule parameter.

The processing module is further configured to add a QoS rule corresponding to the QoS rule parameter to the first bearer based on the first session modification response message.

Embodiment 198: According to the data transmission apparatus in any one of Embodiment 190 to Embodiment 194, the processing module is configured to: if the first session includes a second bearer that matches the first bearer parameter, determine the first bearer as the second bearer.

Embodiment 199: According to the data transmission apparatus in Embodiment 198, the first bearer parameter includes a QoS rule parameter.

The processing module is further configured to obtain a bearer identifier of the first bearer.

The communications module is further configured to send a second session modification request message to the network device, where the second session modification request message includes the session identifier of the first session, the bearer identifier of the first bearer, and the QoS rule parameter, and receive a second session modification response message sent by the network device.

The processing module is further configured to add a QoS rule corresponding to the QoS rule parameter to the first bearer based on the second session modification response message.

Embodiment 200: According to the data transmission apparatus in Embodiment 198, the first bearer parameter includes a QoS rule parameter.

The processing module is further configured to: if the first bearer does not include a QoS rule corresponding to the QoS rule parameter, obtain a bearer identifier of the first bearer.

The communications module is further configured to send a second session modification request message to the network device, where the second session modification request message includes the session identifier of the first session, the bearer identifier of the first bearer, and the QoS rule parameter, and receive a second session modification response message sent by the network device.

The processing module is further configured to add the QoS rule corresponding to the QoS rule parameter to the first bearer based on the second session modification response message.

Embodiment 201: According to the data transmission apparatus in Embodiment 190, the processing module is further configured to obtain a bearer identifier of the first bearer.

The communications module is further configured to send the session identifier of the first session and the bearer identifier of the first bearer to the second terminal device.

Embodiment 202: According to the data transmission apparatus in Embodiment 201, the communications module is further configured to receive second data from the second terminal device, where the second data includes the session identifier of the first session and the bearer identifier of the first bearer, and send the second data to the network device using the first bearer.

Embodiment 203: According to the data transmission apparatus in any one of Embodiment 190 to Embodiment 202, the processing module is further configured to establish a communications link with the second terminal device; and establish a correspondence between the communications link and the first bearer.

Embodiment 204: According to the data transmission apparatus in Embodiment 203, the communications module is further configured to receive third data sent by the second terminal device through the communications link, and send the third data to the network device based on the correspondence using the first bearer.

Embodiment 205: A communications apparatus is provided. The communications apparatus may be a terminal device or a chip or a system on a chip in the terminal device.

The communications apparatus includes a processor and a memory. The memory stores instructions, and when the instructions are executed by the processor, the communications apparatus is enabled to perform the method according to any one of Embodiment 1 to Embodiment 204.

Embodiment 206: A computer program product is provided. When the computer program product runs on a computer, the computer is enabled to perform the method according to any one of Embodiment 1 to Embodiment 204.

Embodiment 207: A computer-readable storage medium is provided. The computer-readable storage medium stores instructions, and when the instructions are run on a computer, the computer is enabled to perform the method according to any one of Embodiment 1 to Embodiment 204.

Embodiment 208: A chip is provided. The chip includes a processor, and when the processor executes instructions, the processor is configured to perform the method according to any one of Embodiment 1 to Embodiment 204. The instructions may be from a memory inside the chip, or may be from a memory outside the chip. Optionally, the chip further includes an input/output circuit.

It should be understood that, in the embodiments of this application, an execution sequence of the steps should be determined based on functions and internal logic of the steps, and sequence numbers of the steps do not mean the execution sequence, and do not constitute a limitation on an implementation process of the embodiments.

The embodiments in this specification are all described in a progressive manner. For same or similar parts in the embodiments, refer to these embodiments. Each embodiment focuses on a difference from other embodiments. Particularly, the embodiments of the session parameter determining apparatus, the data transmission apparatus, the communications system, the computer storage medium, the computer program product, and the chip are basically similar to the method embodiments. Therefore, descriptions are relatively simple. For related parts, refer to the descriptions in the method embodiments.

Although some embodiments of this application have been described, persons skilled in the art can make changes and modifications to these embodiments once they learn of the basic concept. Therefore, the following claims are intended to be construed as to cover the preferred embodiments and all changes and modifications falling within the scope of this application.

The foregoing implementations of this application do not constitute a limitation on the protection scope of this application.

What is claimed is:

1. A data transmission method implemented by a first terminal device, wherein the data transmission method comprises:
receiving a first message from a second terminal device, wherein a first session parameter is based on the first message, and wherein a first session is based on the first session parameter;
receiving a second message from the second terminal device, wherein the second message includes a second bearer parameter of a bearer that meets a service requirement of the second terminal device;
determining a first bearer parameter based on the second bearer parameter or the first message;
establishing a first bearer in the first session based on the first bearer parameter;
receiving first data from the second terminal device; and
sending the first data to a network device using the first bearer in the first session.

2. The data transmission method of claim 1, further comprising:
sending a session establishment request message to the network device, wherein the session establishment request message comprises the first session parameter;
receiving a session establishment response message from the network device; and
establishing the first session based on the session establishment response message.

3. The data transmission method of claim 1, further comprising:
sending a session establishment request message to the network device when there is no second session that matches the first session parameter, wherein the session establishment request message comprises the first session parameter, and wherein the second session has been established between the first terminal device and the network device;
receiving a session establishment response message from the network device; and
establishing the first session based on the session establishment response message.

4. The data transmission method of claim 1, wherein the first message includes session parameter determining information, and wherein the first session parameter is based on the session parameter determining information.

5. The data transmission method of claim 4, wherein the session parameter determining information includes information about an application identifier.

6. The data transmission method of claim 1, further comprising:
sending a session establishment request message to the network device, wherein the session establishment request message comprises the first session parameter and the first bearer parameter;
receiving a session establishment response message from the network device;
establishing the first session based on the session establishment response message; and
establishing the first bearer in the first session.

7. The data transmission method of claim 6, wherein the first bearer parameter comprises a QoS rule parameter, and wherein the data transmission method further comprises adding a QoS rule corresponding to the QoS rule parameter to the first bearer based on the session establishment response message.

8. The data transmission method of claim 6, wherein the first message comprises bearer parameter determining information for the first bearer parameter, and wherein the bearer parameter determining information comprises one or more of:
application information comprising an application type or an application identifier for sending the first data;
device performance information indicating performance of the first terminal device for transmitting the first data;
network access technology information indicating a network accessed by the first terminal device; and
common performance information indicating common performance supported by the first terminal device, wherein the common performance information comprises one or more of: compression coding scheme information and rendering capability information.

9. The data transmission method of claim 6, further comprising:
obtaining a session identifier of the first session and a bearer identifier of the first bearer; and
sending the session identifier and the bearer identifier to the second terminal device.

10. The data transmission method the claim 9, further comprising:
receiving second data from the second terminal device, wherein the second data comprises the session identifier and the bearer identifier; and
sending the second data to the network device using the first bearer.

11. The data transmission method of claim 6, further comprising:
establishing a communications link with the second terminal device; and
establishing a correspondence between the communications link and the first bearer.

12. The data transmission method of claim 1, wherein the first session parameter comprises one or more of: a network slice parameter, a data network name parameter, a session type parameter, a session and service continuity mode parameter, or a handover indication information parameter indicating whether the first terminal device supports switching between two communications modes.

13. A first terminal device comprising:
a memory configured to store instructions; and
a processor coupled to the memory, wherein when executed by the processor, the instructions cause the first terminal device to:
receive a first message from a second terminal device, wherein a first session parameter is based on the first message, and wherein a first session is based on the first session parameter;
receive a second message from the second terminal device, wherein the second message includes a second bearer parameter of a bearer that meets a service requirement of the second terminal device;
determine a first bearer parameter based on the second bearer parameter or the first message;
establish a first bearer in the first session based on the first bearer parameter;
receive first data from the second terminal device; and
send the first data to a network device by using the first bearer in the first session.

14. The first terminal device of claim 13, wherein when executed by the processor, the instructions further cause the first terminal device to:
send a session establishment request message to the network device, wherein the session establishment request message comprises the first session parameter;
receive a session establishment response message from the network device; and
establish the first session based on the session establishment response message.

15. The first terminal device of claim 13, wherein the first message includes session parameter determining information, and wherein the first session parameter is based on the session parameter determining information.

16. A data transmission system comprising:
a second terminal device configured to:
send a first message; and
send first data, and
a first terminal device configured to:
receive the first message from the second terminal device, wherein a first session parameter is based on the first message, and wherein a first session is based on the first session parameter;
receive a second message from the second terminal device, wherein the second message includes a second bearer parameter of a bearer that meets a service requirement of the second terminal device;

determine a first bearer parameter based on the second bearer parameter or the first message;

establish a first bearer in the first session based on the first bearer parameter;

receive the first data from the second terminal device; and send the first data to a network device using the first bearer in the first session.

17. The data transmission system of claim 16, wherein the first message includes session parameter determining information, and wherein the first session parameter is based on the session parameter determining information.

18. The data transmission system of claim 16, wherein the first session parameter comprises a network slice parameter.

19. The data transmission system of claim 16, wherein the first session parameter comprises a data network name parameter.

20. The data transmission system of claim 16, wherein the first session parameter comprises a session type parameter, a session and service continuity mode parameter, or a handover indication information parameter indicating whether the first terminal device supports switching between two communications modes.

* * * * *

UNITED STATES PATENT AND TRADEMARK OFFICE
CERTIFICATE OF CORRECTION

PATENT NO. : 12,219,620 B2  
APPLICATION NO. : 17/707458  
DATED : February 4, 2025  
INVENTOR(S) : Hui Jin et al.

Page 1 of 1

It is certified that error appears in the above-identified patent and that said Letters Patent is hereby corrected as shown below:

On the Title Page

Page 2, Item (56) References Cited, U.S. Patent Documents: "2020/0187043 A1 6/2020 Kin et al." should read "2020/0187043 A1 6/2020 Xin et al."

Page 2, Item (56) References Cited, U.S. Patent Documents: "2022/0158926 A1 05/2022 Wennestr?m" should read "2022/0158926 A1 05/2022 Wenneström"

Signed and Sealed this  
Thirteenth Day of May, 2025

Coke Morgan Stewart  
*Acting Director of the United States Patent and Trademark Office*